(12) United States Patent
Murakami et al.

(10) Patent No.: US 7,086,599 B2
(45) Date of Patent: Aug. 8, 2006

(54) INFORMATION RECORDING MEDIUM, REPRODUCTION METHOD, AND DISCRIMINATION METHOD

(75) Inventors: Teruo Murakami, Yokohama (JP);
Seizaburo Shimizu, Yokohama (JP);
Masao Tanaka, Sagamihara (JP);
Katsuyuki Naito, Tokyo (JP);
Hideyuki Nakao, Kawasaki (JP);
Yutaka Nakai, Yokohama (JP); Yuko Kizu, Yokohama (JP); Hiroki Iwanaga, Yokohama (JP); Aira Hotta, Machida (JP); Shintaro Enomoto, Yokohama (JP); Shuzo Hirahara, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 1027 days.

(21) Appl. No.: 09/883,200

(22) Filed: Jun. 19, 2001

(65) Prior Publication Data

US 2002/0005434 A1 Jan. 17, 2002

(30) Foreign Application Priority Data

Jun. 20, 2000 (JP) .............................. 2000-183955
Jun. 30, 2000 (JP) .............................. 2000-199621

(51) Int. Cl.
*G06K 19/00* (2006.01)

(52) U.S. Cl. ..................... 235/487; 235/494

(58) Field of Classification Search ............... 235/487, 235/494, 492, 491

See application file for complete search history.

(56) References Cited

U.S. PATENT DOCUMENTS

| 4,694,148 A * | 9/1987 | Diekemper et al. .......... 235/468 |
| 4,863,819 A * | 9/1989 | Drexler et al. ................ 430/14 |
| 4,983,817 A * | 1/1991 | Dolash et al. .......... 235/462.04 |
| 6,685,094 B1 * | 2/2004 | Cameron ..................... 235/468 |

FOREIGN PATENT DOCUMENTS

| JP | 7-64106 | 3/1995 |
| JP | 9-90430 | 4/1997 |

OTHER PUBLICATIONS

U.S. Appl. No. 09/883,200, filed Jun. 19, 2001, pending.
U.S. Appl. No. 09/960,489, filed Sep. 24, 2001, pending.
U.S. Appl. No. 10/216,923, filed Aug. 13, 2002, pending.

* cited by examiner

*Primary Examiner*—Karl D. Frech
(74) *Attorney, Agent, or Firm*—Oblon, Spivak, McClelland, Maier & Neustadt, P.C.

(57) ABSTRACT

A liquid crystal display, and a method of manufacturing the same, the display including a substrate; a pixel electrode on the substrate; a pixel isolator surrounding the pixel electrode, the pixel isolator being formed by an insulator. The display also includes a liquid crystal layer on the pixel electrode surrounded by the pixel isolator; a common electrode on the liquid crystal layer; and a counter substrate on the common electrode.

24 Claims, 11 Drawing Sheets

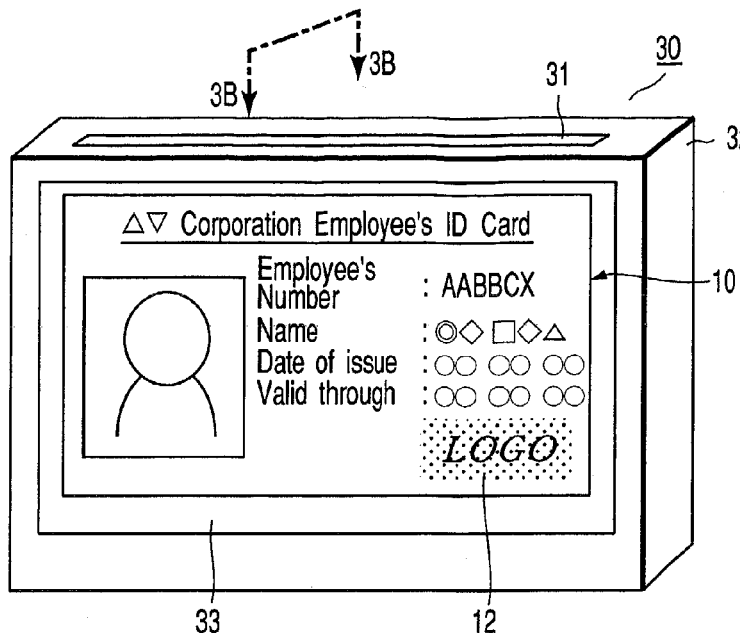
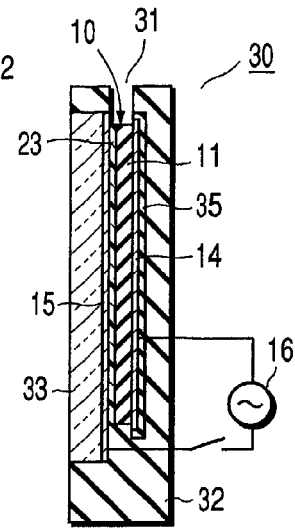
FIG. 3A    FIG. 3B
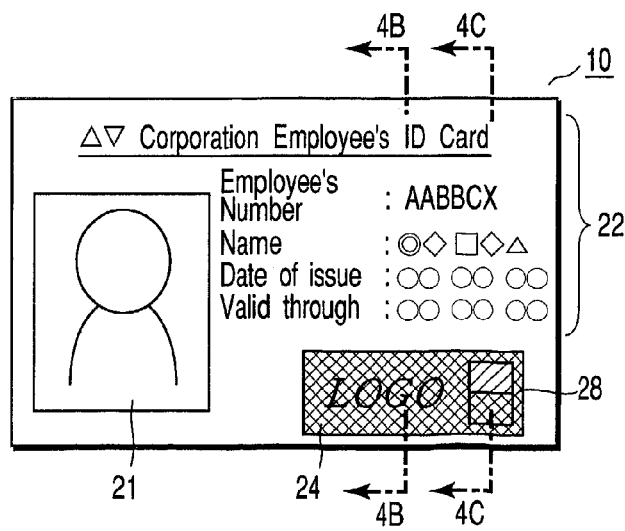
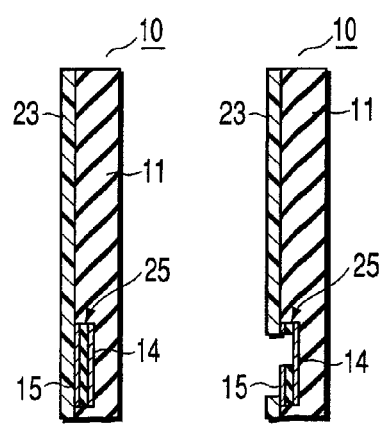
FIG. 4A    FIG. 4B  FIG. 4C

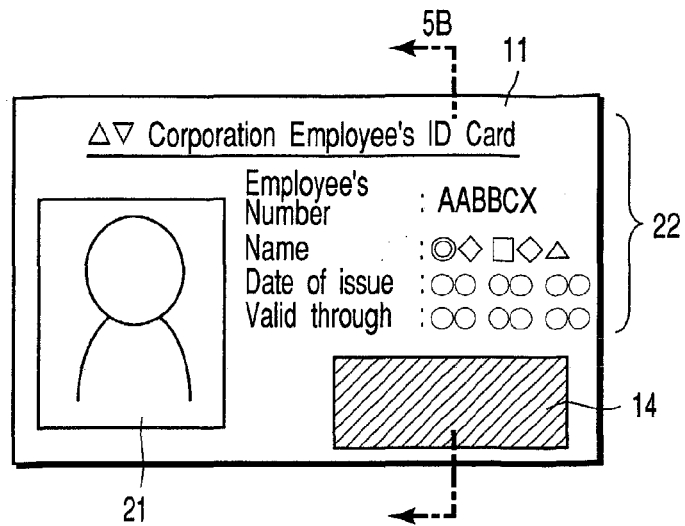
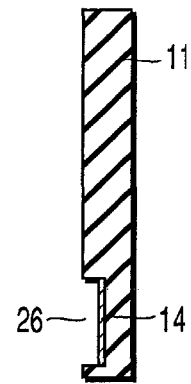
FIG. 5A  FIG. 5B
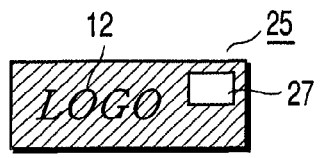
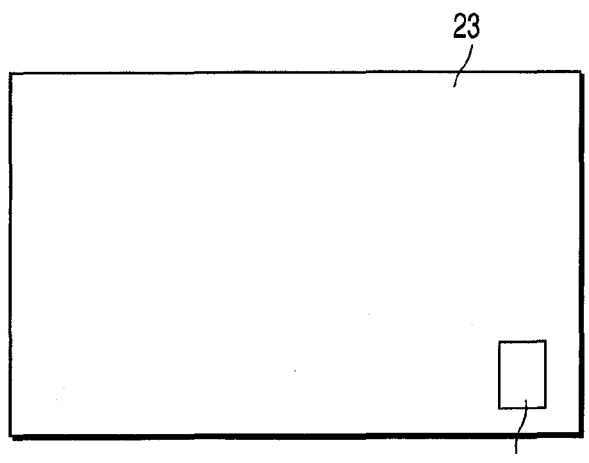
FIG. 6A
FIG. 6B
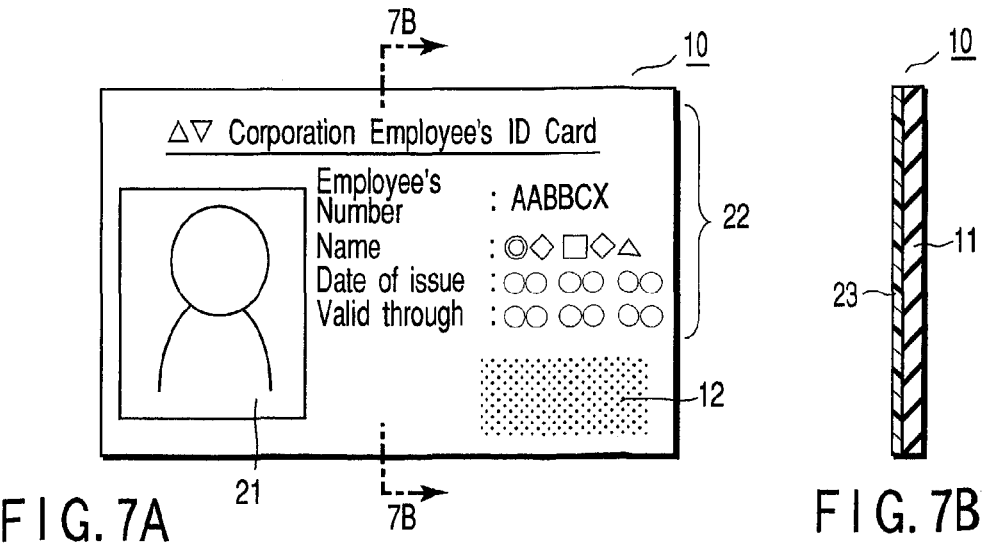
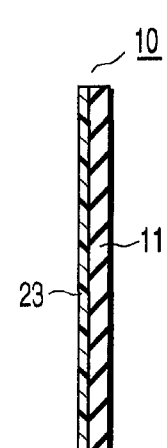
FIG. 7A  FIG. 7B

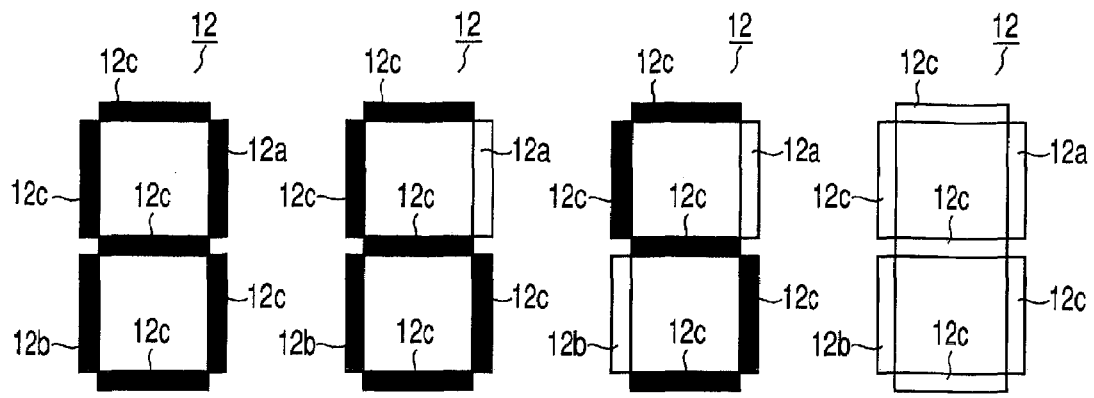
FIG. 19A  FIG. 19B  FIG. 19C  FIG. 19D
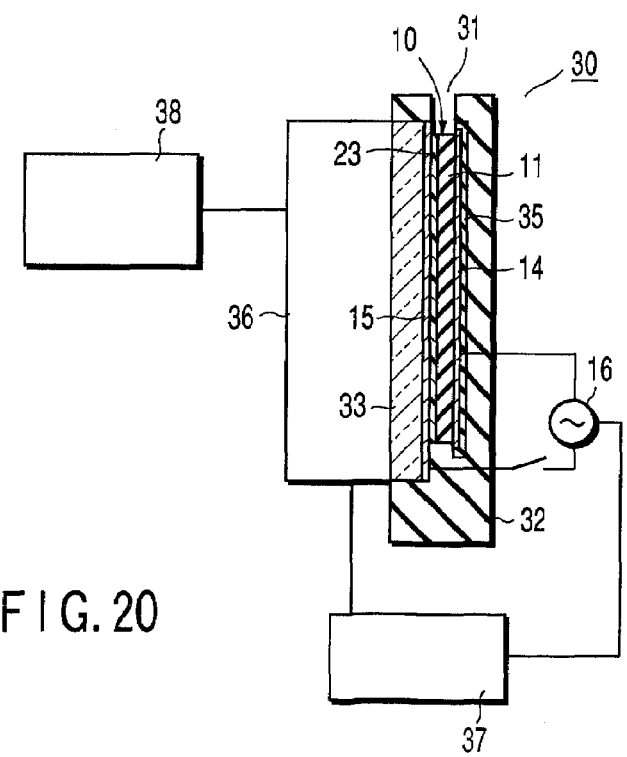
FIG. 20
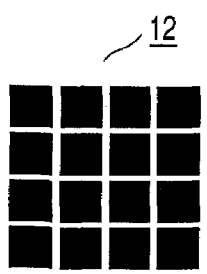 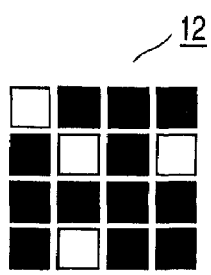 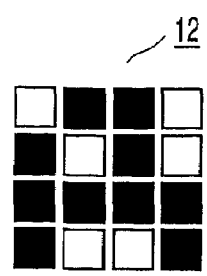 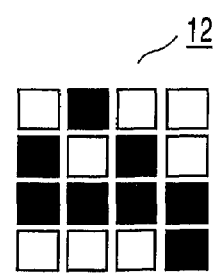
FIG. 21A  FIG. 21B  FIG. 21C  FIG. 12D

INFORMATION RECORDING MEDIUM, REPRODUCTION METHOD, AND DISCRIMINATION METHOD

CROSS-REFERENCE TO RELATED APPLICATIONS

This application is based upon and claims the benefit of priority from the prior Japanese Patent Applications No. 2000-183955, filed Jun. 20, 2000; and No. 2000-199621, filed Jun. 30, 2000, the entire contents of both of which are incorporated herein by reference.

BACKGROUND OF THE INVENTION

The present invention relates to an information recording medium, reproduction method, and discrimination method and, more particularly, to an information recording medium subjected to a forgery and/or fraudulent use preventive measure, a method of reproducing information recorded on the information recording medium, and a method of discriminating an information recording medium whose genuineness is unknown between a genuine article and a counterfeit.

Recently, the performance of input/output apparatuses such as scanners, printers, and copying machines, personal computers, and image processing software has advanced, so even a commercially available apparatus is capable of high-accuracy forgery. To meet the situation, securities and ID cards for personal identification use various forgery preventive techniques.

One forgery preventive technique is to record security information as a latent image (invisible information). A magnetic forgery preventive technique is a representative forgery preventive technique using a latent image. For example, a printed portion using magnetic ink containing a magnetic powder is formed in a predetermined position of a security, and the genuineness thereof is checked by detecting the presence/absence of magnetism or a magnetic pattern. Also, information is magnetically recorded on a magnetic stripe of an ID card, and identification of an individual is performed by reproducing the information.

Unfortunately, the magnetic forgery preventive technique requires a dedicated, expensive reproducing apparatus for reproducing information recorded as a latent image. Also, a person having a little expert knowledge can readily read recorded information. Therefore, this magnetic forgery preventive technique has low immunity to forgery, so a highly secure technique is being demanded.

In addition to the forgery preventive techniques using a latent image, forgery preventive techniques using a hologram or a diffraction pattern are also known. For example, hologram patterns are formed on many ID cards, and hologram slits are formed on paper money and merchandise coupons in certain countries.

The recent progress of the hologram technique makes it possible to obtain highly visible fine diffraction images. However, the manufacture thereof requires advanced techniques, and this increases the manufacturing cost. In addition, a hologram is generally difficult to copy and is therefore considered to be effective as a forgery preventing means, but a light diffraction structure like this can be obtained by duplication technique. Hence, the same light diffraction structure is used for the same type of ID cards. Accordingly, it is readily possible to cut out a hologram portion from a genuine credit card and paste the hologram on a forged credit card.

BRIEF SUMMARY OF THE INVENTION

The present invention has been made in consideration of the above problems, and has as its object to provide an information recording medium having high forgery and/or fraudulent use preventiveness, a reproduction method capable of reproducing information recorded on the medium, and a method of discriminating an information recording medium whose genuineness is unknown between a genuine article and a counterfeit when the above medium is used as a genuine article.

According to the first aspect of the present invention, there is provided an information recording medium comprising a substrate; and a print pattern formed on the substrate and containing a first colorant which changes at least one property selected from the group consisting of a color and a dielectric constant of the first colorant upon application of a first electromagnetic field having a first intensity, and a second colorant which behaves differently from the first colorant upon application of the first electromagnetic field.

According to the second aspect of the present invention, there is provided a method of reproducing information recorded on an information recording medium, which comprises a substrate and a print pattern formed on the substrate and containing a first colorant which changes at least one property selected from the group consisting of a color and a dielectric constant of the first colorant upon application of a first electromagnetic field having a first intensity and a second colorant which behaves differently from the first colorant upon application of the first electromagnetic field, comprising:

reproducing the information by applying an electromagnetic field to the medium.

According to the third aspect of the present invention, there is provided a method of discriminating an information recording medium, which comprises a substrate and a print pattern formed on the substrate and whose genuineness is unknown, between a counterfeit information recording medium and a genuine information recording medium which comprises a substrate and a print pattern formed on the substrate and contains a first colorant which changes at least one property selected from the group consisting of a color and a dielectric constant of the first colorant upon application of a first electromagnetic field having a first intensity and a second colorant which behaves differently from the first colorant upon application of the first electromagnetic field, comprising:

applying an electromagnetic field to the medium whose genuineness is unknown.

The term "information recording medium" herein used primarily means a printed article, such as an ID card, credit card, certificate, or security, on which character information or image information is recorded and for which a forgery and/or fraudulent use preventive measure is required, and includes a printed product, such as an adhesive seal, a self-adhesive sticker, or an adhesive-backed sheeting, which can be used for imparting forgery and/or fraudulent use preventiveness to another article. The term "color" is used in relation to hue, chroma, and lightness, and the expression "change a color" means changing at least one of hue, chroma, and lightness. Also, the term "electromagnetic field" means at least one of an electric field and a magnetic field.

In the first to third aspects of the present invention as described above, the print pattern provided to the information recording medium contains the first and second colorants. The first colorant changes at least one of its color and dielectric constant upon application of an electromagnetic field having first intensity. The second colorant behaves differently from the first colorant upon application of the electromagnetic field having the first intensity. In the first to third aspects, therefore, an information recording medium whose genuineness is unknown can be discriminated between a genuine article and a counterfeit by an extremely simple method of applying an electromagnetic field.

In the first to third aspects of the present invention, a printing method is used to impart forgery and/or fraudulent use preventiveness to the information recording medium. Hence, it is readily possible to record different pieces of information on different media and form complicated patterns. Additionally, recorded information cannot be rewritten when a printing method is used, unlike when a magnetic stripe or the like is formed. That is, in the first to third aspects, it is possible to easily impart forgery and/or fraudulent use preventiveness to the medium and at the same time make forgery and/or fraudulent use very difficult.

In the first to third aspects of the present invention, liquid crystal microcapsules each comprising an electromagnetic field-sensitive liquid crystal material and a film such as a polymer film encapsulating the material can be used as the first colorant. When this is the case, the liquid crystal material can contain a dichroic dye. Also, when the first colorant is a material which changes its color upon application of an electromagnetic field, microcapsules comprising a mixture of a liquid and a color substance which causes electrophoresis, and a film encapsulating the mixture, can be used as the first colorant.

In the first to third aspects of the present invention, a material such as a generally used pigment or dye which maintains its color and dielectric constant unchanged independent of the intensity of an electromagnetic field can be used as the second colorant. This second colorant can be a colored material such as a color pigment or an uncolored material such as a loading pigment. Also, microcapsules formed by encapsulating a pigment or a dye with a film can be used as the second colorant. Furthermore, liquid crystal microcapsules comprising an electromagnetic field-sensitive liquid crystal material and a film such as a polymer film encapsulating the material can be used as the second colorant. In this case, the liquid crystal material can contain a dichroic dye. Microcapsules comprising a mixture of a liquid and a color substance which causes electrophoresis, and a film encapsulating the mixture, can also be used as the second colorant.

When microcapsules are used as both the first and second colorants, the average grain size of microcapsules used as the first material is preferably different from that of microcapsules used as the second colorant. Also, when both the first and second colorants change their colors and dielectric constants upon application of an electromagnetic field, the print pattern usually contains a third colorant which maintains its color and dielectric constant unchanged independently of the intensity of an electromagnetic field.

In the first to third aspects of the present invention, the first and second colorants forming the print pattern can be mixed either uniformly or nonuniformly. The first and second colorants can also form first and second patterns, respectively, without being mixed. In this case, the first and second patterns can form a single graphic pattern, character, or the like, or can form different graphic patterns, characters, or the like. For example, the first and second patterns can form at least a portion of a barcode pattern or dot matrix pattern. Furthermore, the first and second patterns can be formed adjacent to each other, can partially or completely overlap each other, or can be separated from each other.

In the first to third aspects of the present invention, a protective layer or the like can be formed on the print pattern. This protective layer is preferably transparent. However, the protective layer need not be transparent if the substrate is transparent or no color change is used to reproduce information recorded as a latent image.

In the first to third aspects of the present invention, the surface of the substrate can be conductive. For example, a conductive film can be formed on the surface of the substrate on which the print pattern is formed. This conductive film can be used as an electrode when an electromagnetic field is to be applied to the print pattern. The whole substrate can also be conductive.

When the surface of the substrate on which the print pattern is formed is conductive, a conductive film can be formed on the print pattern. That is, the print pattern can be sandwiched between the substrate having the conductive surface and the conductive film. For example, while the print pattern is formed on the conductive surface of the substrate, a substrate having a conductive surface is separately prepared, and these two substrates are adhered such that the print pattern is sandwiched between the conductive surfaces. When this is the case, at least one of these substrates is favorably transparent. Additionally, terminals can be formed to connect these conductive surfaces to an external power supply.

In the first to third aspects of the present invention, when the first colorant changes its color upon application of an electromagnetic field having first intensity, the second colorant can maintain its color unchanged upon application of the electromagnetic field having the first intensity. In this case, an image $I_{g1}$ different from an image $I_{g0}$ displayed when no electromagnetic field is applied can be displayed by applying an electromagnetic field having the first intensity to the medium. Accordingly, it is possible to discriminate a medium whose genuineness is unknown between an genuine article and a counterfeit by comparing at least one of an image $I_{g1}$ displayed by a genuine medium when the electromagnetic field having the first intensity is applied and an image $I_{x0}$ displayed by the medium whose genuineness is unknown when no electromagnetic field is applied, with an image $I_{x1}$ displayed by the medium whose genuineness is unknown when the electromagnetic field having the first intensity is applied.

When the first colorant changes its color upon application of an electromagnetic field having the first intensity and the second colorant remains its color unchanged upon application of the electromagnetic field having the first intensity, the second colorant can change its color upon application of an electromagnetic field having second intensity higher than the first intensity. In this case, the image $I_{g1}$ different from the image $I_{g0}$ can be displayed by applying the electromagnetic field having the first intensity to the medium. Also, the image $I_{g2}$ different from the images $I_{g0}$ and $I_{g1}$ can be displayed by applying the electromagnetic field having the second intensity to the medium. Therefore, it is possible to discriminate a medium whose genuineness is unknown between a genuine article and a counterfeit by comparing at least one image selected from the group consisting of the images $I_{g2}$, $I_{x0}$, and $I_{x1}$ with an image $I_{x2}$ displayed by the medium whose genuineness is unknown when the electromagnetic field having the second intensity is applied, in addition to comparing at least one of the images $I_{g2}$ and $I_{x0}$ with the image $I_{x1}$. Alternatively, it is possible to discriminate the medium whose genuineness is unknown between a genuine article and a counterfeit by comparing the image $I^{x1}$ with the image $I_{g1}$ or by comparing the image $I_{x2}$ with the image $I_{g2}$. When this is the case, one of the images $I_{g1}$ and $I_{g2}$ not used in the discrimination can function as a dummy image. The term "dummy image" herein used means an image not necessarily used in discrimination of a medium whose genuineness is unknown between a genuine article and a counterfeit.

Both the first and second colorants can also change their colors upon application of the electromagnetic field having the first intensity. In this case, if a time $t_1$ required for the first colorant to changes its color after application of the electromagnetic field is shorter than a time $t_2$ required for the second colorant to change its color after application of the electromagnetic field, it is possible to sequentially display an image $I_{gt1}$ different from the image $I_{g0}$ and an image $I_{gt2}$ different from the images $I_{g0}$ and $I_{gt1}$ by applying the electromagnetic field having the first intensity to the medium. Accordingly, discrimination of the medium whose genuineness is unknown between a genuine article and a counterfeit can be performed by, e.g., the following method. That is, it is only necessary to perform at least one comparison selected from the group consisting of comparing an image $I_{xt1}$ displayed after a time $t_3$ has elapsed from application of an electromagnetic field having the first intensity to the medium whose genuineness is unknown with an image $I_{gt1}$ displayed by a genuine medium after the time $t_3$ has elapsed from application of the electromagnetic field having the first intensity, comparing an image $I_{xt2}$ displayed by the medium whose genuineness is unknown after a time $t_4$ has elapsed from application of the electromagnetic field having the first intensity with an image $I_{gt2}$ displayed by the genuine medium after the time $t_4$ has elapsed from application of the electromagnetic field having the first intensity, and comparing the images $I_{x0}$, $I_{xt1}$, and $I_{xt2}$ one another. Note that the time $t_3$ is equal to or longer than the time $t_1$ and shorter than the time $t_2$, and the time $t_4$ is equal to or longer than the time $t_2$. Note also that one of the images $I_{gt1}$ and $I_{gt2}$ not used in the above discrimination can function as a dummy image.

In the first to third aspects of the present invention, when the first colorant changes its dielectric constant upon application of the electromagnetic field having the first intensity, the second colorant can maintain its dielectric constant unchanged upon application of the electromagnetic field having the first intensity. In this case, when the electromagnetic field having the first intensity is applied to the medium, the print pattern forms a dielectric constant distribution $P_{g1}$ different from a dielectric constant distribution $P_{g0}$ formed when no electromagnetic field is applied. These dielectric constant distributions $P_{g0}$ and $P_{g1}$ can be read as electric signals. Therefore, a medium whose genuineness is unknown can be discriminated between a genuine article and a counterfeit by comparing a dielectric constant distribution $P_{x1}$ formed by the print pattern of the medium whose genuineness is unknown when the electromagnetic field having the first intensity is applied, with at least one of the dielectric constant distribution $P_{g1}$ or a dielectric constant distribution $P_{x0}$ formed by the print pattern of the medium whose genuineness is unknown when no electromagnetic field is applied.

When information recorded as a latent image on the information recording medium is to be reproduced by using a color change of the first colorant upon application of an electromagnetic field, it is possible to use, e.g., a reproducing apparatus having an electromagnetic field forming mechanism for applying an electromagnetic field to the print pattern and a window for observing the print pattern. The electromagnetic field forming mechanism can be composed of a pair of plate electrodes for applying a voltage to the print pattern of the information recording medium and a power supply. For example, at least one of these plate electrodes is a transparent electrode formed on one principal surface of a transparent substrate constituting the window. In this structure, a color change of the first colorant can be observed by applying a voltage with the medium sandwiched between the pair of plate electrodes.

Also, when the structure in which the print pattern is sandwiched between the substrate having the conductive surface and the thin conductive film is used and the terminals connecting these conductive surface and thin conductive film to an external power supply are formed as described above, a reproducing apparatus need only be capable of applying a predetermined voltage between the terminals.

When information recorded as a latent image on the information recording medium is to be reproduced by using a dielectric constant change of the first colorant upon application of an electromagnetic field, it is possible to use, e.g., a reproducing apparatus having an electromagnetic field generating mechanism for applying an electromagnetic field to the print pattern and a reading mechanism for reading the dielectric constant distribution of the print pattern as electric signals by applying an electromagnetic field to the print pattern.

The electromagnetic field generating mechanism can be the one which applies an electromagnetic field to the whole print pattern at once or the one which sequentially applies an electromagnetic field from one end to the other end of the print pattern. Likewise, the reading mechanism can be the one which applies an electromagnetic field to the whole print pattern at once or the one which sequentially applies an electromagnetic field from one end to the other end of the print pattern. If the state of the first colorant changes from its normal state upon repetitive reproduction of information, a stronger electromagnetic field need only be applied to the print pattern. When the electromagnetic field generating mechanism is the one which applies a voltage to the print pattern, a voltage for information reading can be superposed on this voltage.

BRIEF DESCRIPTION OF THE SEVERAL VIEWS OF THE DRAWING

FIG. 3A is a perspective view schematically showing an example of a reproducing apparatus for the medium shown in FIGS. 2A and 2B;

FIG. 3B is a sectional view taken along a line 3B—3B of the apparatus shown in FIG. 3A;

FIG. 4A is a plan view schematically showing the information recording medium according to the second embodiment of the present invention;

FIG. 4B is a sectional view taken along a line 4B—4B of the medium shown in FIG. 4A;

FIG. 4C is a sectional view taken along a line 4C—4C of the medium shown in FIG. 4A;

FIG. 5A is a plan view schematically showing a substrate for information recording used in the medium shown in FIGS. 4A and 4B;

FIG. 5B is a sectional view taken along a line 5B—5B of the substrate shown in FIG. 5A;

FIG. 6A is a plan view schematically showing an intermediate member used in the medium shown in FIGS. 4A and 4B;

FIG. 6B is a plan view schematically showing a protective film used in the medium shown in FIGS. 4A and 4B;

FIG. 7A is a plan view schematically showing the state of an information recording medium according to the third embodiment of the present invention when no voltage is applied;

FIG. 7B is a side view taken along a line 7B—7B of the medium shown in FIG. 7A;

FIGS. 19A to 19D are plan views showing a portion of a print pattern of the medium shown in FIG. 18;

FIG. 20 is a view schematically showing an example of a reproducing apparatus used in discriminating a genuineness of the medium shown in FIG. 18;

FIGS. 21A to 21D are plan views schematically showing examples of a print pattern according to the eighth embodiment of the present invention;

DETAILED DESCRIPTION OF THE INVENTION

Figure 1A:
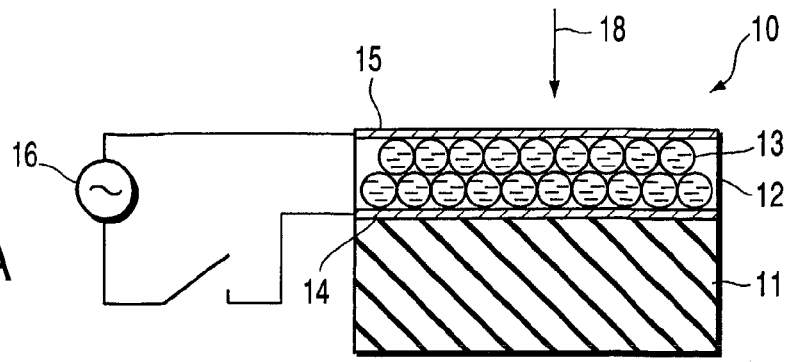
FIG. 1A is a sectional view schematically showing the state of an information recording medium according to the first to third embodiments of the present invention when no voltage is applied.

The present invention will be described in more detail below with reference to the accompanying drawings. The same reference numerals denote the same parts in the drawing, and a duplicate explanation will be omitted.

First, the common principle of the first to third embodiments of the present invention will be described below with reference to FIGS. 1A and 1B.

Figure 1B:
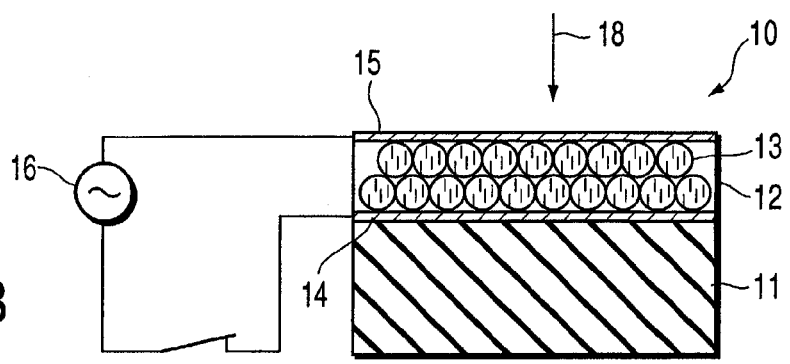
FIG. 1B is a sectional view schematically showing the state in which a voltage is applied to the medium shown in FIG. 1A.

FIGS. 1A and 1B are schematic views for explaining the forgery and/or fraudulent use preventive technique according to the first to third embodiments of the present invention. More specifically, FIG. 1A shows the section of an information recording medium with no voltage applied, and FIG. 1B shows the section of the information recording medium with a voltage applied.

As shown in FIGS. 1A and 1B, an information recording medium 10 according to the first to third embodiments of the present invention is primarily composed of a substrate 11 for information recording and a print pattern 12 formed on one principal surface of the substrate 11. The print pattern 12 contains, as one type of its colorants, liquid crystal microcapsules 13 each formed by encapsulating a mixture of a field-sensitive liquid crystal material and a dichroic dye with a thin transparent film. The print pattern 12 also contains a colorant which does not change its color even when impressed with an electric field, as another colorant.

For example, as shown in FIGS. 1A and 1B, this print pattern 12 is sandwiched between a pair of electrodes 14 and 15 which can be connected to a power supply 16. When no voltage is applied, as shown in FIG. 1A, the direction of alignment of liquid crystal molecules in the liquid crystal microcapsules 13 is substantially parallel to the substrate surface. Accordingly, the direction of alignment of dichroic dye molecules (not shown) is also substantially parallel to the substrate surface.

The dichroic dye changes its light absorptive power (absorbance) in accordance with the relationship between its molecular axis and the oscillation direction of light. That is, the dichroic dye absorbs light whose oscillation direction is parallel to the absorption axis (normally perpendicular to the molecular axis), and hardly absorbs light whose oscillation direction is perpendicular to the absorption axis. When the medium 10 is observed in a direction indicated by an arrow 18, therefore, the amount of light absorption by the dichroic dye is a maximum with no voltage applied.

When a voltage is applied, as shown in FIG. 1B, the alignment direction of the liquid crystal molecules in the liquid crystal microcapsules 13 is perpendicular to the substrate surface. Accordingly, the alignment direction of the dichroic dye molecules (not shown) is also perpendicular to the substrate surface. Hence, when the medium 10 is observed in the direction of the arrow 18, the amount of light absorption by the dichroic dye is a minimum with a voltage applied.

That is, the color of the print pattern 12 when no voltage is applied differs from that when a voltage is applied. By using this phenomenon, it is possible to form a latent image which cannot be perceived in the normal state and becomes visible when a voltage is applied.

The substrate 11 of the information recording medium 10 can be any of, e.g., various types of cards such as an ID card and an IC card, and various types of securities such as a bill and a bond. Examples of the material of this substrate 11 are vinyl chloride, PET, and paper. As the material of the substrate 11, it is also possible to use a metal or alloy such as iron, SUS, aluminum, or copper, or a composite material formed by coating a metal or alloy with a resin such as polyurethane. The substrate 11 can be a flexible material such as paper or plastic, or a hard material such as a metal plate or a plastic card.

In the liquid crystal microcapsules 13 forming the print pattern 12 described above, the liquid crystal material can be any of liquid crystal compounds represented by formulas (1) to (10) below.

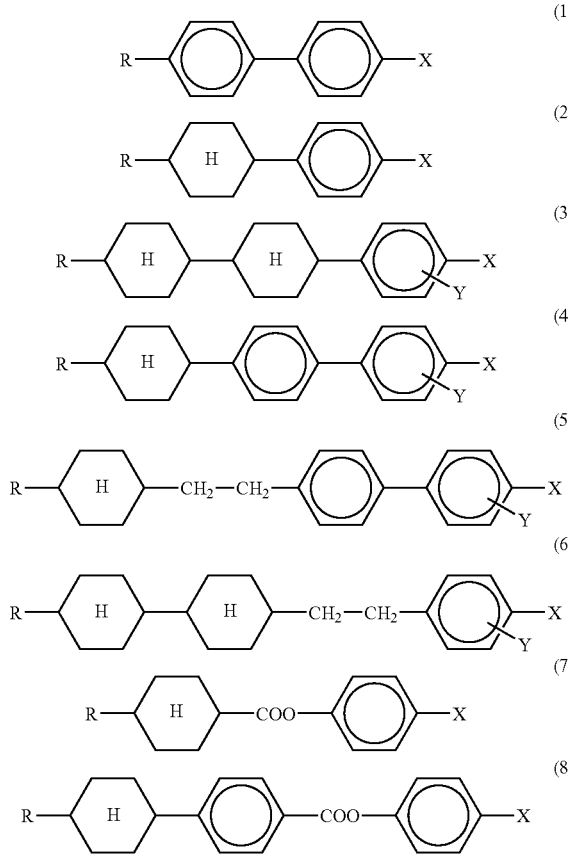

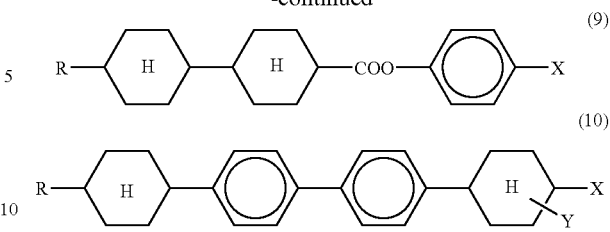

In above formulas (1) to (10), each of substituting groups R and X indicates an alkyl group, alkoxy group, alkylphenyl group, alkoxyalkylphenyl group, alkoxyphenyl group, alkylcyclohexyl group, alkoxyalkylcyclohexyl group, alkylcyclohexylphenyl group, cyanophenyl group, cyano group, halogen atom, fluoromethyl group, fluoromethoxy group, alkylphenylalkyl group, alkoxyalkylphenylalkyl group, alkoxyalkylcyclohexylalkyl group, alkylcyclohexylalkyl group, alkoxyalkoxycyclohexylalkyl group, alkoxyphenylalkyl group, or alkylcyclohexylphenylalkyl group, and a substituting group Y indicates a hydrogen atom or halogen atom.

The alkyl chain or alkoxy chain of the substituting groups R and X can have an optical activity, and each of the substituting groups R and X can be a substituting group in which a phenyl group or phenoxy group is substituted by a halogen atom such as a fluorine atom or chlorine atom. Each of the substituting groups R and X can also be a substituting group in which a hydrogen atom of a phenyl group is substituted by one or two halogen atoms such as fluorine atoms or chlorine atoms.

As the liquid crystal material, a liquid crystal composition as a mixture of liquid crystal compounds represented by formulas (1) to (10) described above can be used. Although any of these liquid crystal compounds represented by formulas (1) to (10) has positive dielectric anisotropy, a liquid crystal compound having negative dielectric anisotropy can also be used. For example, as the liquid crystal material, it is possible to use a liquid crystal composition prepared by mixing a liquid crystal compound having negative dielectric anisotropy and a liquid crystal compound having positive dielectric anisotropy such that the dielectric anisotropy becomes positive. A liquid crystal compound or liquid crystal composition having negative dielectric anisotropy can also be used as the liquid crystal material. Furthermore, a liquid crystal compound or liquid crystal composition to which a chiral agent is added can be used.

Examples of the dichroic dye added to the above liquid crystal material are yellow dyes represented by formulas (11) to (19), magenta dyes represented by formulas (20) to (27), and cyan dyes represented by formulas (28) to (31).

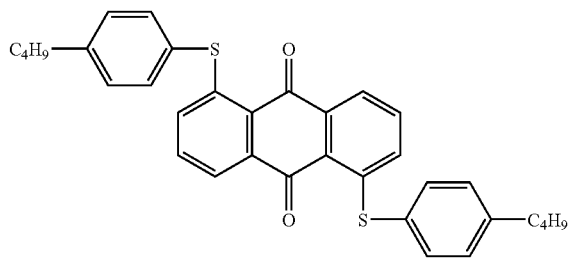

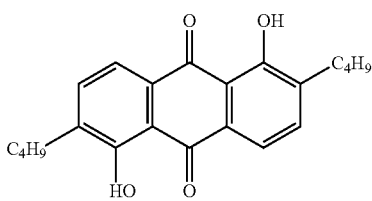

-continued
(13)
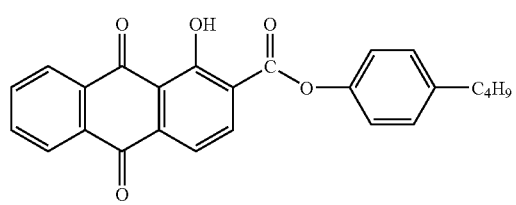
(14)
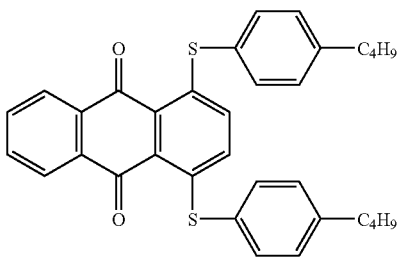
(15)
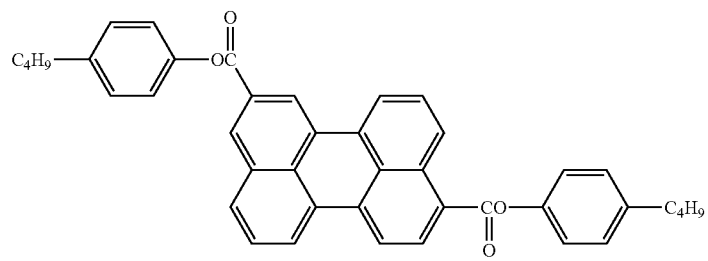
(16)
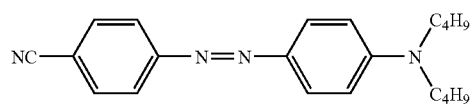
(17)
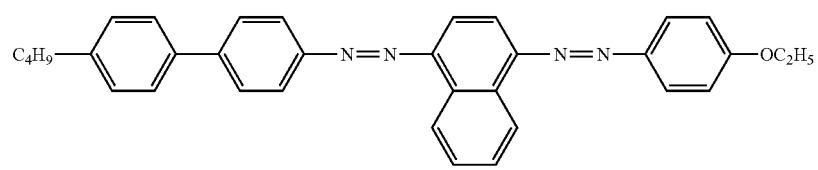
(18)
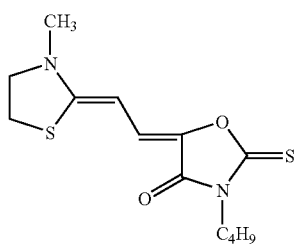
(19)
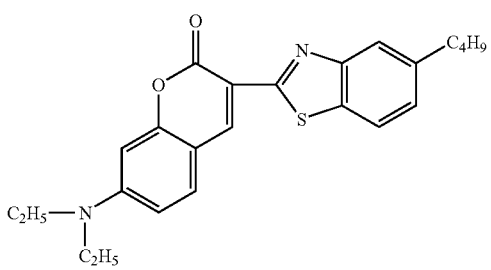
(20)
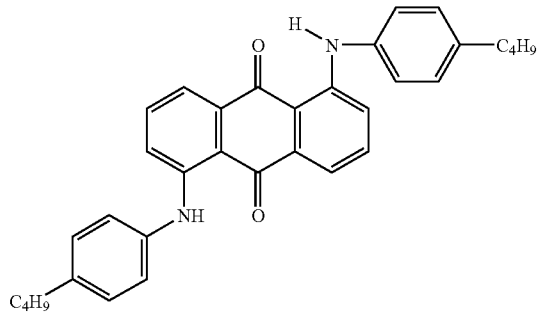
(21)
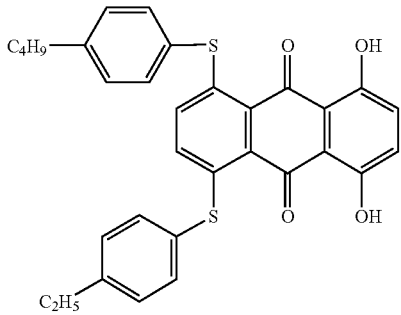

-continued

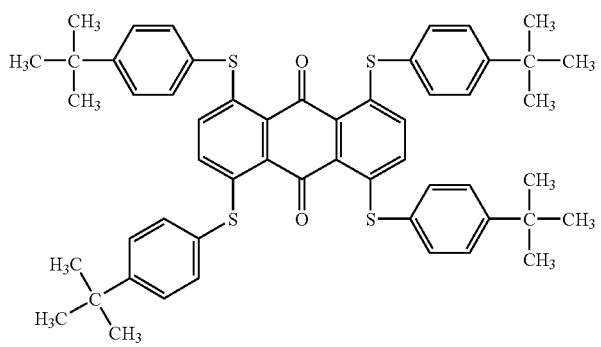
(22)

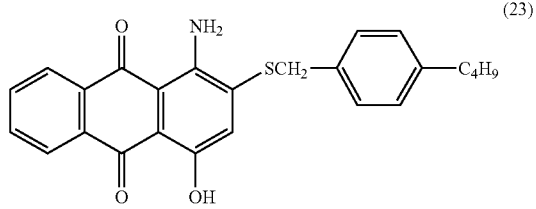
(23)

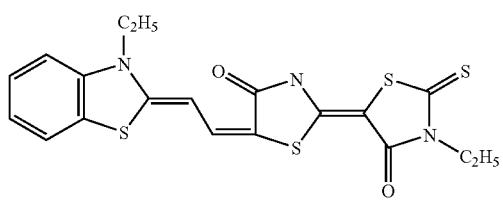
(24)

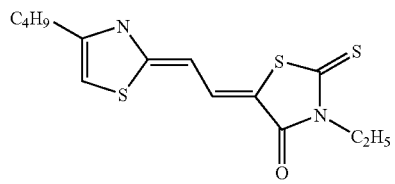
(25)

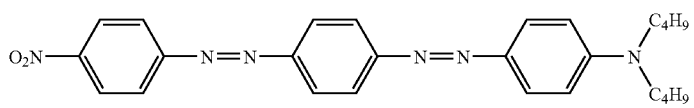
(26)

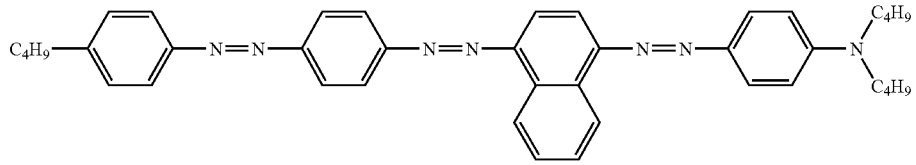
(27)

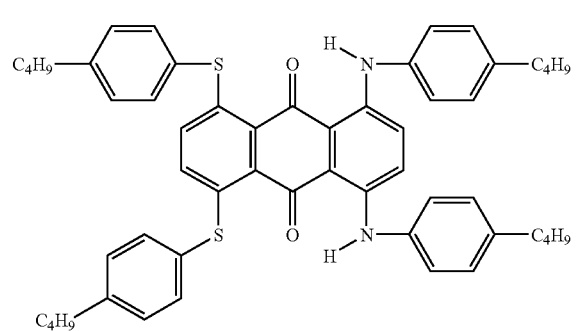
(28)

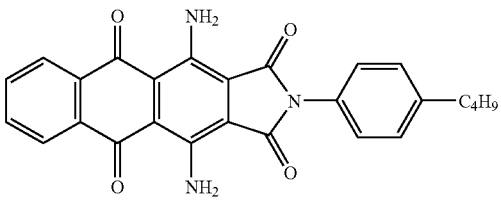
(29)

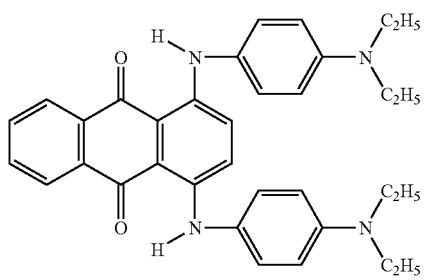
(30)

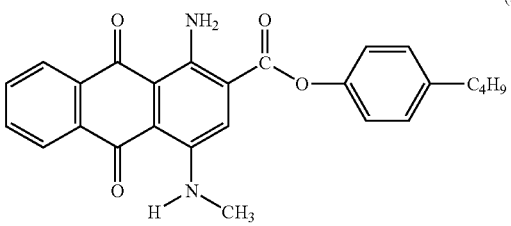
(31)

The mixing ratio of the dichroic dye to the liquid crystal compound or liquid crystal composition is preferably about 0.01 to about 10 wt % and more preferably about 0.1 to about 5 wt %. If the mixing ratio of the dichroic dye is smaller than the lower limit, no satisfactory contrast can be obtained. If the mixing ratio exceeds the upper limit, the color remains when a voltage is applied, and this may lower the contrast.

As the transparent film encapsulating the liquid crystal material described above, almost all polymer materials can be used. Examples are polyethylenes; chlorinated polyethylenes; ethylene copolymers such as an ethylene-vinyl acetate copolymer and ethylene-acrylic acid-maleic anhydride copolymer; polybutadienes; polyesters such as polyethyleneterephthalate, polybutyleneterephthalate, and polyethylenenaphthalate; polypropylenes; polyisobutylenes; polyvinyl chlorides; natural rubber; polyvinylidene chlorides; polyvinyl acetates; polyvinyl alcohols; polyvinyl acetals; polyvinyl butyrals; ethylene tetrafluoride resins; ethylene chloride trifluoride resins; ethylene fluoride/propylene resins; vinylidene fluoride resins; vinyl fluoride resins; ethylene tetrafluoride copolymers such as an ethylene tetrafluoride-perfluoroalkoxyethylene copolymer, ethylene tetrafluoride-perfluoroalkylvinylether copolymer, ethylene tetrafluoride-propylene hexafluoride copolymer, and ethylene tetrafluoride-ethylene copolymer; fluorine resins such as fluorine-containing polybenzoxazole; acrylic resins; methacrylic resins; fumaric acid resins; maleic acid resins; polyacrylonitriles; acrylonitrile copolymers such as an acrylonitrile-butadiene-styrene copolymer; polystyrenes; styrene-acrylonitrile copolymers; acetal resins; polyamides such as nylon 66; polycarbonates; polyestercarbonates; cellulose-based resins; phenol-based resins; urea resins; epoxy resins; unsaturated polyester resins; alkyd resins; melamine resins; polyurethanes; diarylphthalate resins; polyphenylene oxides; polyphenylene sulfides; polysulfones; polyphenylsulfones; silicone resins; polyimides; bismaleimidotriazine resins; polyimidoamides; polyetherimides; polyvinylcarbazoles; norbornene-based amorphous polyolefins; and celluloses.

The liquid crystal microcapsules 13 constructed as above can be manufactured by using any conventionally used method such as film emulsification, phase separation, submerged drying, interfacial polymerization, in-situ polymerization, submerged cure covering, or spray drying.

Ink for forming the print pattern 12 on the substrate 11 can contain a binder resin in addition to the liquid crystal microcapsules 13. As this binder resin, a thermoplastic resin can be used. Examples are polyethylenes; chlorinated polyethylenes; ethylene copolymers such as an ethylene-vinyl acetate copolymer and ethylene-acrylic acid-maleic anhydride copolymer; polybutadienes; polyesters such as polyethyleneterephthalate, polybutyleneterephthalate, and polyethylenenaphthalate; polypropylenes; polyisobutylenes; polyvinyl chlorides; polyvinylidene chlorides; polyvinyl acetates; polyvinyl alcohols; polyvinyl acetals; polyvinyl butyrals; ethylene tetrafluoride resins; ethylene chloride trifluoride resins; ethylene fluoride-propylene resins; vinylidene fluoride resins; vinyl fluoride resins; ethylene tetrafluoride copolymers such as an ethylene tetrafluoride-perfluoroalkoxyethylene copolymer, ethylene tetrafluoride-perfluoroalkylvinylether copolymer, ethylene tetrafluoride-propylene hexafluoride copolymer, and ethylene tetrafluoride-ethylene copolymer; fluorine resins such as fluorine-containing polybenzoxazole; acrylic resins; methacrylic resins such as methyl polymethacrylate; polyacrylonitriles; acrylonitrile copolymers such as an acrylonitrile-butadiene-styrene copolymer; polystyrenes; polystyrene halides; styrene copolymers such as a styrene-methacrylic acid copolymer and styrene-acrylonitrile copolymer; ionic polymers such as sodium polystyrenesulfonate and sodium polyacrylate; acetal resins; polyamides such as nylon 66; gelatin; gum arabic; polycarbonates; polyestercarbonates; cellulose-based resins; phenol-based resins; urea resins; epoxy resins; unsaturated polyester resins; alkyd resins; melamine resins; polyurethanes; diarylphthalate resins; polyphenylene oxides; polyphenylene sulfides; polysulfones; polyphenylsulfones; silicone resins; polyimides; bismaleimidotriazine resins; polyimidoamides; polyethersulfones; polymethylpentenes; polyetheretherketones; polyetherimides; polyvinylcarbazoles; and norbornene-based amorphous polyolefins.

When the binder is water-soluble, ink can be prepared by dispersing the binder and the liquid crystal microcapsules 13 in water or the like as a dispersing medium. When the binder is insoluble in water, ink can be prepared in the form of an emulsion by dispersing the binder and the liquid crystal microcapsules 13 in water or the like as a dispersing medium. The binder content in the ink is preferably 50% or less of the liquid crystal microcapsules 13. The smaller the binder content, the larger the volume ratio of the liquid crystal material in the print pattern 12, so the more significant the color change.

The print pattern 12 can be formed by a known printing method using the above-mentioned ink. Note that this ink used to form the print pattern 12 can further contain ink containing colorants which do not change their colors even when impressed with an electric field, i.e., can further contain conventionally used regular ink.

The first to third embodiments will be described below in this order.

Figure 2A:
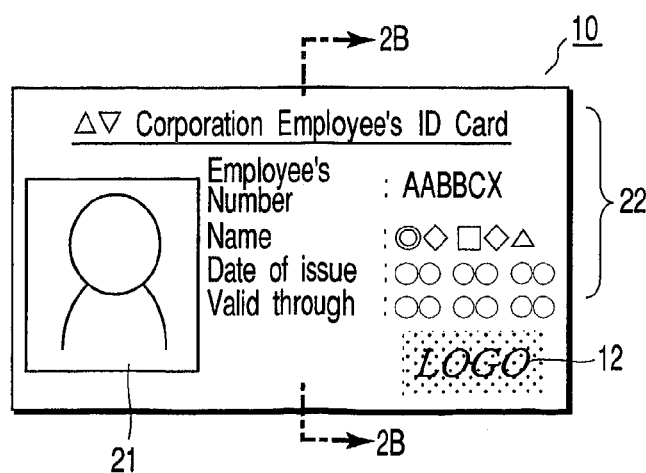
FIG. 2A is a plan view schematically showing an information recording medium according to the first embodiment of the present invention.
Figure 2B:
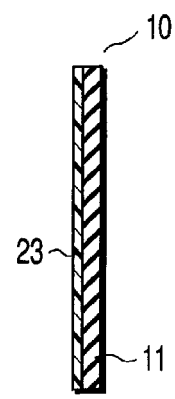
FIG. 2B is a sectional view taken along a line 2B—2B of the medium shown in FIG. 2A.

FIG. 2A is a plan view schematically showing an information recording medium according to the first embodiment of the present invention. FIG. 2B is a sectional view taken along a line 2B—2B of the medium shown in FIG. 2A. This information recording medium 10 shown in FIGS. 2A and 2B is a personal identification card such as an employee's ID card. The card 10 has a substrate 11 for information recording such as plastic substrate. On one principal surface of this substrate 11, an image 21 such as a photograph of the owner's face and characters 22 such as the employee number, name, date of issue, and term of validity are printed. A print pattern constructing the image 21 and the characters 22 is formed using ink containing colorants which do not change their colors even with application of an electric field, i.e., using conventionally used regular ink.

On the surface of the substrate 11 on which the image 21 and the characters 22 are printed, a print pattern 12 such as a logo mark constructing a security image is formed. This print pattern 12 is formed using ink containing colorants which change their colors upon application of an electric field. As at least one type of these colorants, the ink contains liquid crystal microcapsules 13 formed by encapsulating a mixture of a field-sensitive liquid crystal material and dichroic dye with a thin transparent film. On the surface of the substrate 11 on which the image 21, the characters 22, and the print pattern 12 are formed, a transparent resin film or the like is adhered as a protective film 23 for protecting these pieces of information.

The print pattern 12 can be formed using ink which contains liquid crystal microcapsules 13 manufactured by the following method.

First, 80 parts by weight of the ZLI-1840 nematic liquid crystal with positive dielectric anisotropy manufactured by Merck, 1 part by weight of the G-176 magenta dichroic dye manufactured by Nippon Kanko Shikiso Kenkyujo, 7 parts by weight of a hydrophilic methylmethacrylate monomer, 7 parts by weight of hydrophobic isobutylmethacrylate, 1 part by weight of ethylene glycol dimethacrylate as a crosslinking agent, and 0.2 parts by weight of benzoyl peroxide are mixed and dissolved. The solution mixture thus prepared is dispersed in a solution mixture of 3 parts by weight of polyvinyl alcohol and 300 parts by weight of pure water by using a homogenizer, thereby obtaining an emulsion.

This emulsion is stirred for one hour at a temperature of 85° C. and a stirring rate of 500 rpm to polymerize the monomer components. when one hour has elapsed, the emulsion is passed through a filter having a pore size of 1 μm and washed with pure water three times to obtain liquid crystal microcapsules 13 having an average grain size of 6 μm.

Ink is prepared by dispersing the liquid crystal microcapsules 13 thus manufactured at a concentration of 10% in a 5% dispersion of fine vinyl acetate grains having an average grain size of 0.5 μm. The print pattern 12 can be formed by using the ink obtained as above.

The genuineness of the card 10 shown in FIGS. 2A and 2B can be checked by using, e.g., an apparatus as shown in FIGS. 3A and 3B.

FIG. 3A is a perspective view schematically showing a reproducing apparatus used to check the genuineness of the card 10 shown in FIGS. 2A and 2B. FIG. 3B is a sectional view taken along a plane 3B—3B of the apparatus shown in FIG. 3A. This reproducing apparatus 30 shown in FIGS. 3A and 3B is composed primarily of a housing 32 having an insertion slot 31 for inserting the card 10, a transparent substrate 33 which is provided to the housing 32 and constituting a window, a transparent electrode 15 provided to that surface of the substrate 33, which faces the card 10, a support plate 35 attached to the inner surface of the housing 32, and an electrode 14 provided to this support plate 35. The electrodes 14 and 15 can be connected to a power supply 16.

The genuineness of the card 10 can be checked using this reproducing apparatus 30 by, e.g., the following method. First, the card 10 is inserted into the insertion slot 31 of the reproducing apparatus 30 and loaded into the reproducing apparatus 30 by a mechanism not shown. Note that the card 10 is inserted with the print pattern 12 facing the transparent substrate 33, so that this print pattern 12 can be observed through the substrate 33 made of transparent glass or resin. Then, an AC or DC voltage is applied between the electrodes 14 and 15 from the power supply 16. As a consequence, the direction of alignment of dichroic dye molecules in the liquid crystal microcapsules 13 forming the print pattern 12 changes. This lowers the contrast and hence the visibility of the security image 12 which is clearly seen when no voltage is applied. By observing the presence/absence of a change like this, the genuineness of the card 10 can be readily checked.

On the substrate 11, a background of the print pattern 12 which changes its color upon application of a voltage can also be formed by using a colorant which does not change its color even when impressed with a voltage, or by using microcapsules containing such a colorant. For example, when an inverted pattern having the same color as that of the print pattern 12 when no voltage is applied is formed as this background, the existence of the print pattern 12 is hard to be perceived because this print pattern 12 and its background have the same color when no voltage is applied. That is, the print pattern 12 can be formed into a latent image.

The second embodiment of the present invention will be described below.

FIG. 4A is a plan view schematically showing an information recording medium according to the second embodiment of the present invention. FIG. 4B is a side view taken along a line 4B—4B of the medium shown in FIG. 4A. FIG. 4C is a sectional view taken along a line 4C—4C of the medium shown in FIG. 4A. This information recording medium 10 shown in FIGS. 4A to 4C is a personal identification card such as an employee's ID card, and composed primarily of a substrate 11, an intermediate member 25 embedded in a recess formed in one surface of the substrate 11, and a protective film 23 formed on that surface of the substrate 11, in which the intermediate member 25 is embedded. Reference numeral 24 denotes a genuineness check area. The individual members forming the card 10 shown in FIGS. 4A to 4C will be described below with reference to FIGS. 5A, 5B, 6A, and 6B.

FIG. 5A is a plan view schematically showing the substrate 11 used in the card 10 shown in FIGS. 4A to 4C. FIG. 5B is a sectional view taken along a line 5B—5B of the card 10 shown in FIG. 5A. FIG. 6A is a plan view schematically showing the intermediate member 25 used in the card 10 shown in FIGS. 4A to 4C. FIG. 6B is a plan view schematically showing the protective film 23 used in the card 10 shown in FIGS. 4A to 4C.

The substrate 11 shown in FIGS. 5A and 5B is made of, e.g., plastic. On one principal surface of this substrate 11, an image 21 such as a photograph of the owner's face and characters 22 such as the employee number, name, date of issue, and term of validity are printed. A print pattern forming the image 21 and the characters 22 is formed using ink containing colorants which do not change their colors even when impressed with an electric field, i.e., using conventionally used regular ink. In addition, a recess 26 is formed in that surface of the substrate 11, on which the image 21 and the characters 22 are printed. An electrode 14 is formed on the bottom surface of this recess 26.

The intermediate member 25 shown in FIG. 6A has the shape of a flat plate which fits in the recess 26 of the substrate 11. An opening 27 is formed in this intermediate member 25. On one principal surface of the intermediate member 25, a print pattern 12 such as a logo mark constructing a security image is formed. This security image 12 is formed using ink containing colorants which change their colors upon application of an electric field. As at least one type of these colorants, the ink contains liquid crystal microcapsules 13 formed by encapsulating a mixture of a field-sensitive liquid crystal material and a dichroic dye with a thin transparent film. Also, a transparent electrode 15 is formed on the other principal surface of the intermediate member 25.

The protective film 23 shown in FIG. 6B is a transparent resin film or the like. An opening 28 is formed in this protective film 23. This opening 28 partially exposes the electrodes 14 and 15 in the card 10 shown in FIGS. 4A to 4C.

As is apparent from the above explanation, the genuineness check area 24 of the card 10 shown in FIGS. 4A to 4C has a structure in which the security image 12 is sandwiched between the electrodes 14 and 15 which are partially exposed in the opening 28. Accordingly, the genuineness of the card 10 shown in FIGS. 4A to 4C can be checked by an extremely simple method, i.e., connecting a pair of terminals connected to an AC power supply to the electrodes 14 and 15 exposed in the opening 28. That is, genuineness check can be performed by a reproducing apparatus with a simple structure.

This effect can be obtained even when another structure is used as the card 10. As an example, a substrate 11 having a conductive surface is prepared. A print pattern 12 and the like are formed on the conductive surface of this substrate 11, and an insulating film is formed on the print pattern 12. Alternatively, an insulating film is formed on the conductive surface of the substrate 11, and a print pattern 12 is formed on the insulating film. After that, a transparent electrode is formed on the stacked body of the print pattern 12 and the insulating film. The above effect can be obtained even with the card 10 thus obtained.

The third embodiment of the present invention will be described below.

Figure 8:
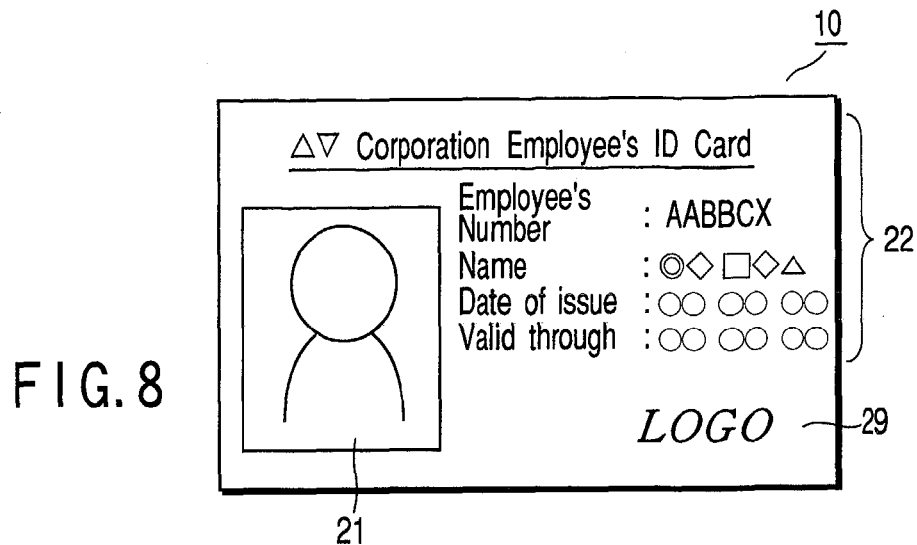
FIG. 8 is a plan view schematically showing the state of the medium shown in FIGS. 7A and 7B when a voltage is applied.

FIG. 7A is a plan view schematically showing the state of an information recording medium according to the third embodiment of the present invention when no voltage is applied. FIG. 7B is a sectional view taken along a line 7B—7B of the medium shown in FIG. 7A. FIG. 8 is a plan view schematically showing the state of the medium shown in FIGS. 7A and 7B when a voltage is applied.

This information recording medium 10 shown in FIGS. 7A, 7B, and 8 is a personal identification card such as an employee's ID card. The card 10 has an information recording substrate 11 such as plastic. On one principal surface of this substrate 11, an image 21 such as a photograph of the owner's face and characters 22 such as the employee number, name, date of issue, and term of validity are printed. A print pattern constructing the image 21 and the characters 22 is formed using ink containing colorants which do not change their colors even with application of an electric field, i.e., using conventionally used regular ink.

On the surface of the substrate 11 on which the image 21 and the characters 22 are printed, a logo mark 29 constructing a security image is formed. This logo mark 29 is covered with a print pattern 12 to be used as a security window. Note that the logo mark 29 is formed using ink containing colorants which do not change their colors even when impressed with an electric field. The print pattern 12 is formed by a printing method by using ink containing colorants which change their colors upon application of an electric field. As at least one type of these colorants, the ink contains liquid crystal microcapsules 13 formed by encapsulating a mixture of a field-sensitive liquid crystal material and a dichroic dye with a thin transparent film. On the surface of the substrate 11 on which the image 21, the characters 22, the logo mark 29, and the print pattern 12 are formed, a transparent resin film or the like is adhered as a protective film 23 for protecting these pieces of information.

The print pattern 12 can be formed using ink which contains liquid crystal microcapsules 13 manufactured by the following method.

First, 80 parts by weight of the LIXON-5065xx nematic liquid crystal with positive dielectric anisotropy manufactured by Chisso, 1 part by weight of the S-435 black dichroic dye manufactured by Mitsui Kagaku, 7 parts by weight of a hydrophilic methylmethacrylate monomer, 7 parts by weight of hydrophobic isobutylmethacrylate, 1 part by weight of ethylene glycol dimethacrylate as a crosslinking agent, and 0.2 parts by weight of benzoyl peroxide are mixed and dissolved. The solution mixture thus prepared is dispersed in a solution mixture of 3 parts by weight of polyvinyl alcohol and 300 parts by weight of pure water by using a homogenizer, thereby obtaining an emulsion.

This emulsion is stirred for one hour at a temperature of 85° C. and a stirring rate of 500 rpm to polymerize the monomer components. When one hour has elapsed, the emulsion is passed through a filter having a pore size of 1 μm and washed with pure water three times to obtain liquid crystal microcapsules 13 having an average grain size of 6 μm.

Ink is prepared by dispersing the liquid crystal microcapsules 13 thus manufactured at a concentration of 10% in a 5% dispersion of fine vinyl acetate grains having an average grain size of 0.5 μm. The print pattern 12 can be formed by using the ink obtained as above.

As shown in FIG. 7A, the print pattern 12 forming the security window of this card 10 is normally colored, so the logo mark 29 covered with this print pattern 12 is invisible or difficult to perceive. When a voltage is applied to the print pattern 12 by using the reproducing apparatus 30 shown in FIGS. 3A and 3B, the amount of light absorbed by the print pattern 12 forming the security window reduces. As shown in FIG. 8, therefore, the logo mark 29 covered with the print pattern 12 emerges. Thus, genuineness check can also be performed using the print pattern 12 as an optical shutter.

In the first to third embodiments described above, a color change of a print pattern is used to check the genuineness of an information recording medium. In the fourth and fifth embodiments to be explained below, a change in the dielectric constant of a print pattern is used to check the genuineness of an information recording medium.

A liquid crystal molecule changes its dielectric constant in accordance with the alignment direction which is the average molecular axis direction, i.e., has so-called dielectric anisotropy. In the fourth embodiment, a print pattern is formed by using a colorant having this dielectric anisotropy and a common colorant having no dielectric anisotropy. First, the principle used by the fourth embodiment will be described below.

Figures 9A, 9B, 9C:
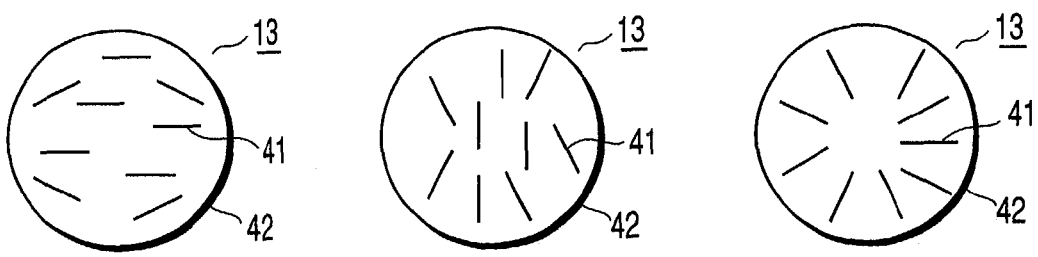
FIGS. 9A to 9C are views each schematically showing the state of alignment of liquid crystal molecules in a liquid crystal microcapsule used in the fourth embodiment of the present invention when no electromagnetic field is applied.

FIGS. 9A to 9C are views each schematically showing the alignment direction, with no electromagnetic field applied, of liquid crystal molecules in a liquid crystal microcapsule used in the fourth embodiment of the present invention. A liquid crystal microcapsule 13 shown in each of FIGS. 9A to 9C constructs a print pattern formed on a substrate. Referring to FIGS. 9A to 9C, the lateral direction is the direction parallel to the principal surface of the substrate.

Figure 10A:
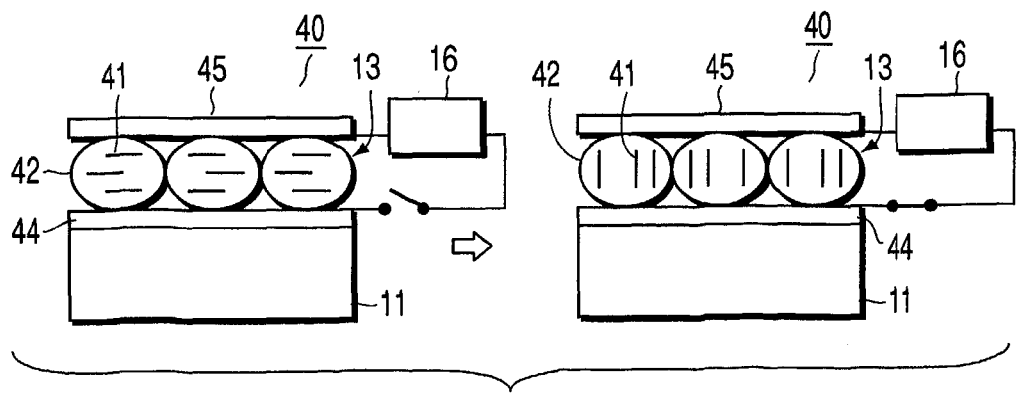
FIGS. 10A to 10D are schematic views for explaining the principle used in the fourth embodiment of the present invention.
Figure 10B:
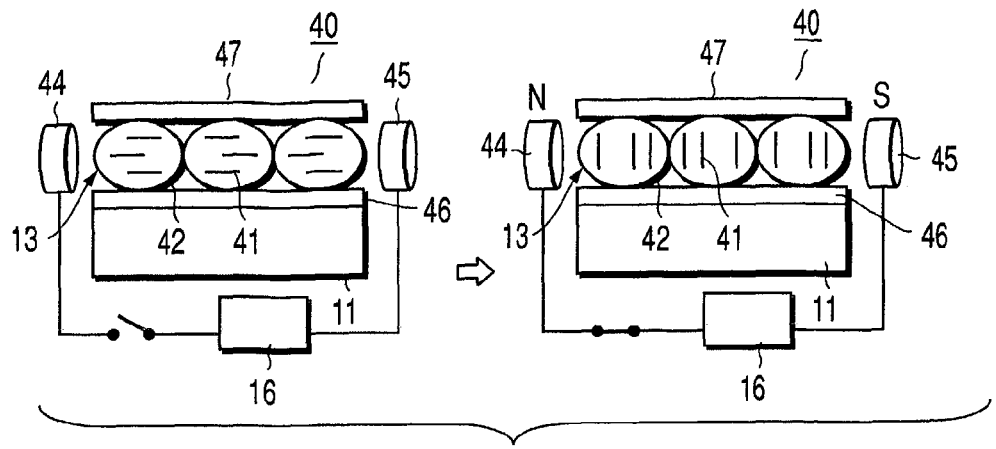
Figure 10C:
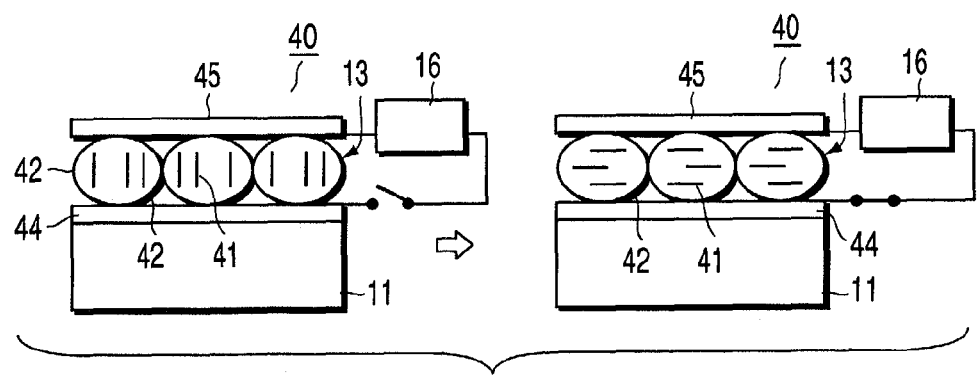

FIGS. 10A to 10D are schematic views for explaining the principle used in the fourth embodiment of the present invention. In each of FIGS. 10A to 10D, the left-hand side indicates the alignment state of liquid crystal molecules when no electromagnetic field is formed, and the right-hand side indicates the alignment state of liquid crystal molecules when an electromagnetic field is formed. Reference numeral 40 denotes an information recording medium; 44 and 45, electrodes for generating a dielectric constant distribution in a print pattern containing liquid crystal molecules 13 and a regular colorant; and 46 and 47, electrodes for reading the dielectric constant distribution. Referring to FIGS. 10A and 10C., the electrodes 44 and 45 for generating a dielectric constant distribution also serves as the electrodes 46 and 47 for reading.

The liquid crystal microcapsule 13 shown in FIGS. 9A to 9C has a structure in which liquid crystal molecules 41 are encapsulated with a film 42 such as a transparent film. The dielectric constant of this liquid crystal microcapsule 13 changes in accordance with the alignment state of the liquid crystal molecules 41. When no electromagnetic field is applied, the alignment state of the liquid crystal molecules 41 depends upon the liquid crystal alignment regulating direction of the film 42.

For example, when the film 42 has a liquid crystal alignment regulating force along the film surface, as shown in FIG. 9A, the liquid crystal molecules 41 usually align substantially uniformly parallel to the principal surface of the substrate 11. That is, a bipolar alignment state parallel to the principal surface of the substrate 11 is obtained.

When an electromagnetic field is externally applied, liquid crystal molecules, whose Δε as a difference between the dielectric constant in the major axis direction and that in the minor axis direction of the molecules is positive, align such that the major axis direction is parallel to the direction of the electromagnetic field. On the other hand, liquid crystal molecules whose Δε is negative align such that the minor axis direction is parallel to the electromagnetic field direction.

When the liquid crystal molecules 41 take the alignment state shown in FIG. 9A with no electromagnetic field applied, therefore, the liquid crystal molecule alignment state can be changed as shown in FIG. 10A by using a liquid crystal material whose Δε is positive and using a structure which generates a dielectric constant distribution by applying an electromagnetic field perpendicular to the principal surface of the substrate 11. Also, when the liquid crystal molecules 41 take the alignment state shown in FIG. 9A with no electromagnetic field applied, the liquid crystal molecule alignment state can be changed as shown in FIG. 10B by using a liquid crystal material whose Δε is negative and using a structure which generates a dielectric constant distribution by applying an electromagnetic field parallel to the principal surface of the substrate 11. An electromagnetic field can be readily pointed in the direction perpendicular to the principal surface of the substrate 11 as shown in FIG. 10A. However, when an electromagnetic field is applied in a non-contact state, the direction of this electromagnetic field can be made parallel to the principal surface of the substrate 11 as shown in FIG. 10B.

Figure 10D:
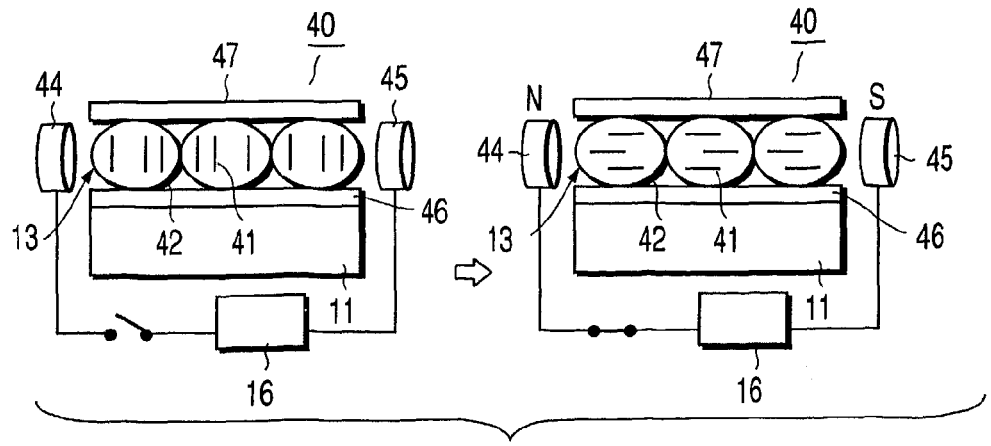

When the film 42 has a liquid crystal regulating force perpendicular to the film surface, the liquid crystal molecules 41 substantially uniformly align (axial alignment state) perpendicular to the principal surface of the substrate 11 as shown in FIG. 9B, or radially align (radial alignment state) as shown in FIG. 9C. When the liquid crystal molecules 41 take such an alignment state with no electromagnetic field applied, the liquid crystal molecule alignment state can be changed as shown in FIG. 10C by using a liquid crystal material whose Δε is negative and using a structure which generates a dielectric constant distribution by applying an electromagnetic field perpendicular to the principal surface of the substrate 11. Also, when the liquid crystal molecules 41 take the axial or radial alignment state with no electromagnetic field applied, the liquid crystal molecule alignment state can be changed as shown in FIG. 10D by using a liquid crystal material whose Δε is positive and using a structure which generates a dielectric constant distribution by applying an electromagnetic field parallel to the principal surface of the substrate 11.

Accordingly, a dielectric constant distribution can be generated only when a predetermined electromagnetic field is applied by appropriately using the arrangement shown in any of FIGS. 10A to 10D in accordance with the alignment state of the liquid crystal molecules 41 with no electromagnetic field applied, and making the dielectric constant of the liquid crystal microcapsule 13, in the direction perpendicular to the principal surface of the substrate 11, substantially equal to the dielectric constant of a regular colorant (having no dielectric anisotropy) when no electromagnetic field is applied.

Figure 11A:
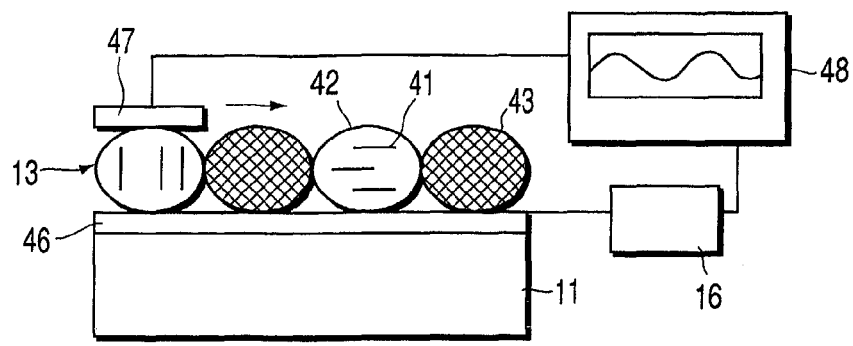
FIGS. 11A to 11C are views schematically showing the principle of reading a dielectric constant distribution used in a genuineness checking method according to the fourth embodiment of the present invention.
Figure 11B:
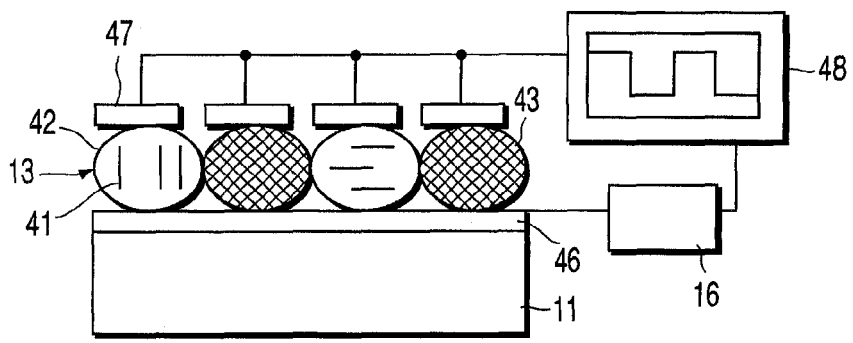
Figure 11C:
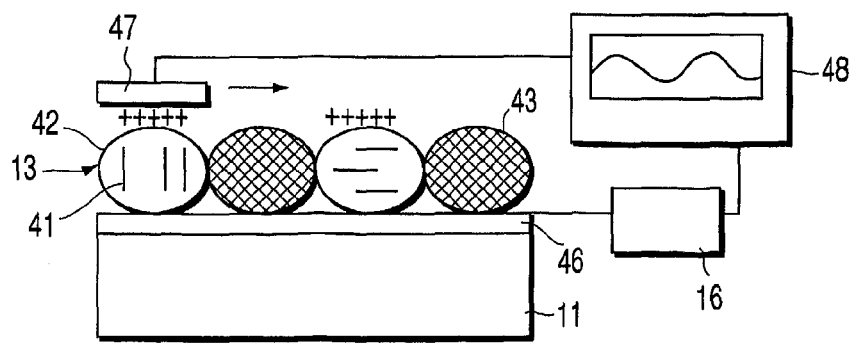

This dielectric constant distribution can be read by principles shown in FIGS. 11A to 11C.

FIGS. 11A to 11C are views each schematically showing the principle of reading the dielectric constant distribution used in an genuineness checking method according to the fourth embodiment of the present invention. In each of FIGS. 11A to 11C, reference numeral 48 denotes a waveform obtained by reading the dielectric constant distribution. Also, in each of FIGS. 11A to 11C, the electrodes 46 and 47 for reading also function as the electrodes 44 and 45 for generating a dielectric constant distribution.

As shown in FIG. 11A, while a predetermined voltage is applied between the electrodes 46 and 47, the electrode 47 is scanned in contact with a print pattern containing the liquid crystal microcapsules 13 and a regular colorant 43. Consequently, the dielectric constant of the regular colorant 43 remains unchanged, whereas the dielectric constant of the liquid crystal microcapsules 13 between the electrodes 46 and 47 changes from the normal state. Hence, a dielectric constant distribution corresponding to the alignments of the liquid crystal molecules 13 and the regular colorant 43 can be observed as a sinusoidal waveform 48 shown in FIG. 11A.

Also, as shown in FIG. 11B, at least one of the electrodes 46 and 47 can be a matrix electrode. A dielectric constant distribution corresponding to the liquid crystal molecules 13 and the regular colorant 43 can be observed as a rectangular waveform 48 as shown in FIG. 11B.

Furthermore, as shown in FIG. 11C, a dielectric constant distribution can be read as an electrostatic charge distribution by scanning the electrode 47 apart from the print pattern. When this is the case, a high signal level can be realized by applying electrostatic charge to the print pattern surface by using corona discharge or the like.

Figure 12A:
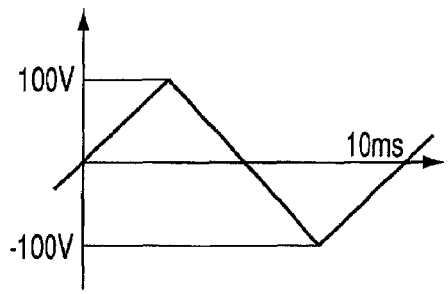
FIG. 12A is a graph showing an example of the waveform of a voltage for generating a dielectric constant distribution.
Figure 12B:
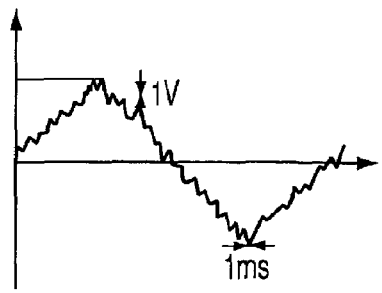
FIG. 12B is a graph showing an example of a waveform obtained by superposing the waveform of an electric field for reading onto the waveform of the voltage for generating a dielectric constant distribution shown in FIG. 12A.

As described above, in each of the FIGS. 11A to 11C the electrodes 46 and 47 for reading also serve as the electrodes 44 and 45 for generating a dielectric constant distribution. This is realized by using a high-voltage, DC or low-frequency waveform as the waveform of an electric field for generating a dielectric constant distribution, using a low-voltage, high-frequency waveform as the waveform of an electric field for reading, and simultaneously applying the voltage for distribution generation and the voltage for reading between the pair of electrodes 46 and 47, i.e., for superposing the waveform of the electric field for reading onto the waveform of the electric field for distribution generation. FIGS. 12A and 12B illustrate examples.

FIG. 12A is a graph showing an example of the waveform of the voltage for generating a dielectric constant distribution. FIG. 12B is a graph showing an example of the waveform obtained by superposing the waveform of the electric field for reading onto the waveform of the voltage for generating a dielectric constant distribution shown in FIG. 12A. Referring to FIGS. 12A and 12B, the abscissa indicates time, and the ordinate indicates the voltage. When the voltage having the waveform as shown in FIG. 12B is applied between the electrodes 46 and 47, the electrodes 44 and 45 are unnecessary.

In this embodiment as explained above, a print pattern is formed using a first colorant having dielectric anisotropy and a second colorant having no dielectric anisotropy, and the dielectric constants of these first and second colorants are made substantially equal to each other in the normal state. Therefore, a dielectric distribution is not generated when no electromagnetic field is applied and is generated when a predetermined electromagnetic field is applied, and this dielectric constant distribution disappears when the electric field is removed. Accordingly, it is possible to realize forging and/or fraudulent use preventiveness superior to that when a print pattern is formed using a plurality of colorants differing in dielectric constant.

Figure 13A:
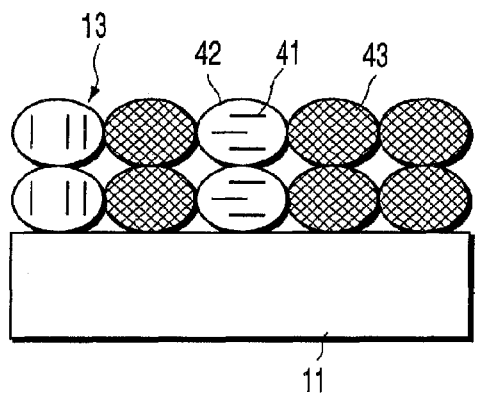
FIG. 13A is a view schematically showing an example of a print pattern of an information recording medium according to the fourth embodiment of the present invention.
Figure 13B:
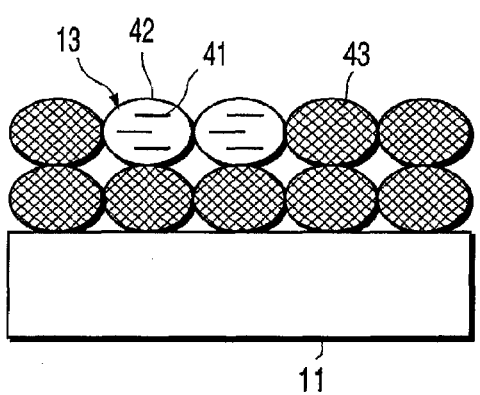
FIG. 13B is a view schematically showing another example of the print pattern of the information recording medium according to the fourth embodiment of the present invention.

In this embodiment, the print pattern formed by the first colorant having dielectric anisotropy and the second material having no dielectric anisotropy can have structures shown in FIGS. 13A and 13B.

FIG. 13A is a view schematically showing an example of the print pattern of the information recording medium according to the fourth embodiment of the present invention.

FIG. 13B is a view schematically showing another example of the print pattern of the information recording medium according to the fourth embodiment of the present invention. The reproduction quality of an electric constant distribution improves when the print pattern 12 has the structure as shown in FIG. 13A in which the liquid crystal microcapsules 13 as the first colorant having dielectric anisotropy are juxtaposed with the second colorant 43 having no dielectric anisotropy, or has the structure as shown in FIG. 13B in which the liquid crystal microcapsules 13 are embedded in a portion of the surface of a layer formed by the second colorant 43.

Figure 14A:
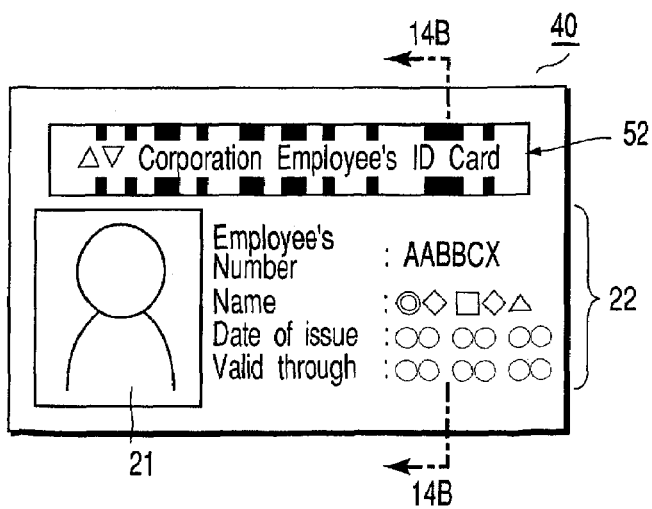
FIG. 14A is a plan view schematically showing an example of the information recording medium according to the fourth embodiment of the present invention.
Figure 14B:
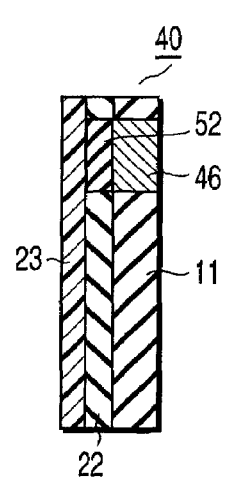
FIG. 14B is a sectional view taken along a line 14B—14B of the medium shown in FIG. 14A.

An information recording medium as shown in FIGS. 14A and 14B can be implemented by the use of the principles as explained above.

FIG. 14A is a plan view schematically showing an example of the information recording medium according to the fourth embodiment of the present invention. FIG. 14B is a sectional view taken along a line 14B—14B of the medium shown in FIG. 14A. This information recording medium 40 shown in FIGS. 14A and 14B is a personal identification card such as an employee's ID card. The card 40 has an information recording substrate 11 such as plastic. On one principal surface of this substrate 11, an image 21 such as a photograph of the owner's face and characters 22 such as the employee number, name, date of issue, and term of validity are printed. A print pattern constructing the image 21 and the characters 22 is formed using ink containing colorants which do not change their colors even with application of an electric field, i.e., using conventionally used regular ink.

A rectangular opening is formed in the substrate 11, and a light-reflective electrode 46 is fitted in this opening. On this electrode 46, a print pattern 52 constructing a security image is formed as a barcode pattern. This print pattern 52 is formed using ink containing the liquid crystal microcapsules 13. On the surface of the substrate 11 on which the image 21, the characters 22, and the print pattern 52 are formed, a transparent resin film or the like is adhered as a protective film 23 for protecting these pieces of information.

The print pattern 52 can be formed using ink which contains liquid crystal microcapsules 13 manufactured by the following method.

First, 81 parts by weight of the ZLI-1840 nematic liquid crystal with positive dielectric anisotropy manufactured by Merck, 7 parts by weight of a hydrophilic methylmethacrylate monomer, 7 parts by weight of hydrophobic isobutyl-methacrylate, 1 part by weight of ethylene glycol dimethacrylate as a crosslinking agent, and 0.2 parts by weight of benzoyl peroxide are mixed and dissolved. The solution mixture thus prepared is dispersed in a solution mixture of 3 parts by weight of polyvinyl alcohol and 300 parts by weight of pure water by using a homogenizer, thereby obtaining an emulsion.

This emulsion is stirred for one hour at a temperature of 85° C. and a stirring rate of 500 rpm to polymerize the monomer components. When one hour has elapsed, the emulsion is passed through a filter having a pore size of 1 μm and washed with pure water three times to obtain liquid crystal microcapsules 13 having an average grain size of 6 μm.

Ink is prepared by dispersing the liquid crystal microcapsules 13 thus manufactured at a concentration of 10% in a 5% dispersion of fine vinyl acetate grains having an average grain size of 0.5 μm. The print pattern 52 can be formed by using the ink obtained as above.

Figure 15A:
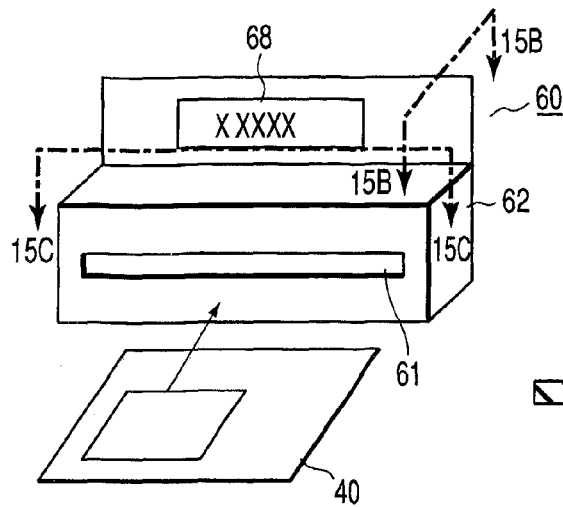
FIG. 15A is a perspective view schematically showing an example of a reproducing apparatus for the medium shown in FIGS. 14A and 14B.
Figure 15B:
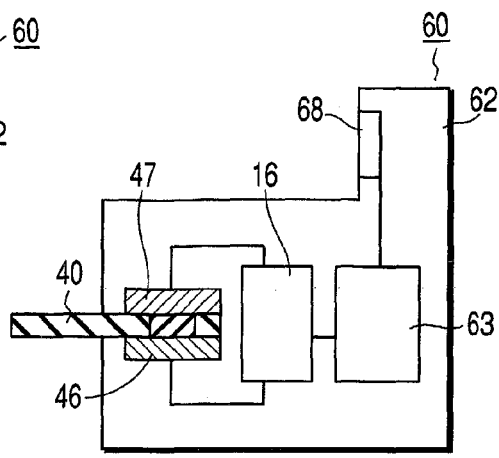
FIG. 15B is a sectional view taken along a plane 15B—15B of the apparatus shown in FIG. 15A.
Figure 15C:
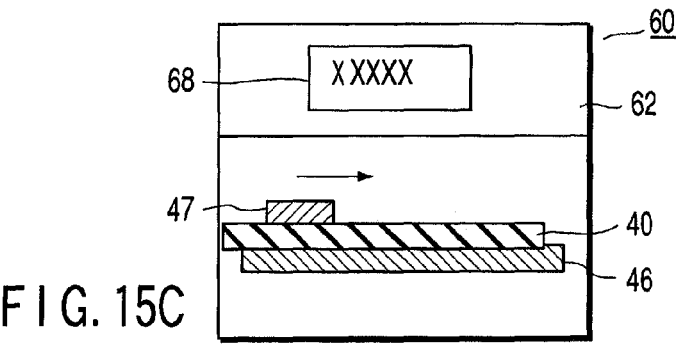
FIG. 15C is a sectional view taken along a plane 15C—15C of the apparatus shown in FIG. 15A.

The genuineness of the card 40 shown in FIGS. 14A and 14B can be checked by using, e.g., an apparatus as shown in FIGS. 15A to 15C.

FIG. 15A is a perspective view schematically showing a reproducing apparatus used to check the genuineness of the card shown in FIGS. 14A and 14B. FIG. 15B is a view schematically showing a sectional structure taken along a plane 15B—15B of the apparatus shown in FIG. 15A. FIG. 15C is a view schematically showing a sectional structure taken along a plane 15C—15C of the apparatus shown in FIG. 15A. This reproducing apparatus 60 shown in FIGS. 15A to 15C has a housing 62 having an insertion slot 61 for inserting the card 40. This housing 62 has a display unit 68 for displaying information recorded as the print pattern 52 on the card 40 as numbers or the like. The housing 62 also contains an AC power supply 16, electrodes 46 and 47 connected to the AC power supply 16, and a data processor 63 connected to the AC power supply 16 and the display unit 68.

The genuineness of the card 40 can be checked using this reproducing apparatus 60 by, e.g., the following method. First, the card 40 is inserted into the insertion slot 61 of the reproducing apparatus 60, and the print pattern 52 of the card 40 is sandwiched between the electrodes 46 and 47. Then, an AC voltage having the waveform shown in FIG. 12B is applied between the electrodes 46 and 47 from the power supply 16, and simultaneously the electrode 47 is moved at a velocity of 10 cm/sec. As a consequence, the alignment direction of the liquid crystal molecules 41 in the liquid crystal microcapsules 13 forming the print pattern 12 changes between the electrodes 46 and 47, and the capacitance between these electrodes 46 and 47 changes accordingly.

The data processor 63 compares the potential waveform between the electrodes 46 and 47 with that of the AC power supply 16 obtained at the same timing. From the difference, the data processor 63 detects a digital signal generated by a displacement current and converts this digital signal into numerical sequence information by predetermined decoding. The obtained numerical sequence information is displayed on the display unit 68. For example, the genuineness of the card 40 can be checked by comparing the numerical sequence displayed on the display unit 68 with the information printed as the characters 22 on the card 40.

Figure 16A:
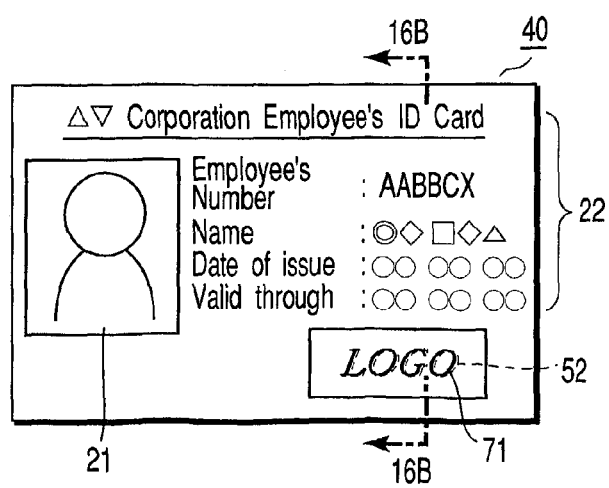
FIG. 16A is a plan view schematically showing another example of the medium according to the fourth embodiment of the present invention.
Figure 16B:
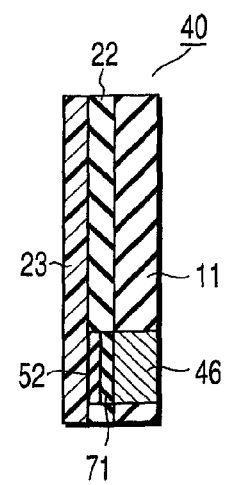
FIG. 16B is a sectional view taken along a line 16B—16B of the medium shown in FIG. 16A.

Also, an information recording medium shown in FIGS. 16A and 16B can be implemented by using the aforementioned principles.

FIG. 16A is a plan view schematically showing another example of the information recording medium according to the fourth embodiment of the present invention. FIG. 16B is a sectional view taken along a line 16B—16B of the medium shown in FIG. 16A. This information recording medium 40 shown in FIGS. 16A and 16B is a personal identification card such as an employee's ID card. The card 40 has an information recording substrate 11 such as plastic. On one principal surface of this substrate 11, an image 21 such as a photograph of the owner's face and characters 22 such as the employee number, name, date of issue, and term of validity are printed. A print pattern constructing the image 21 and the characters 22 is formed using ink containing colorants which do not change their colors even with application of an electric field, i.e., using conventionally used regular ink.

A rectangular opening is formed in the substrate 11, and a light-reflective electrode 46 is fitted in this opening. On this electrode 46, a logo mark 71 is printed by using regular black ink. On this logo mark 71, a print pattern 52 constructing a security image is formed into a pattern matching the logo mark 71. This print pattern 52 is formed using ink containing the liquid crystal microcapsules 13. On the surface of the substrate 11 on which the image 21, the characters 22, and the print pattern 52 are formed, a transparent resin film or the like is adhered as a protective film 23 for protecting these pieces of information.

The print pattern 52 can be formed using ink which contains liquid crystal microcapsules 13 manufactured by the following method.

First, 80 parts by weight of the LIXON-5065xx nematic liquid crystal with positive dielectric anisotropy manufactured by Chisso, 1 part by weight of the S-435 black dichroic dye manufactured by Mitsui Kagaku, 7 parts by weight of a hydrophilic methylmethacrylate monomer, 7 parts by weight of hydrophobic isobutylmethacrylate, 1 part by weight of ethylene glycol dimethacrylate as a crosslinking agent, and 0.2 parts by weight of benzoyl peroxide are mixed and dissolved. The solution mixture thus prepared is dispersed in a solution mixture of 3 parts by weight of polyvinyl alcohol and 300 parts by weight of pure water by using a homogenizer, thereby obtaining an emulsion.

This emulsion is stirred for one hour at a temperature of 85° C. and a stirring rate of 500 rpm to polymerize the monomer components. When one hour has elapsed, the emulsion is passed through a filter having a pore size of 1 μm and washed with pure water three times to obtain liquid crystal microcapsules 13 having an average grain size of 6 μm.

Ink is prepared by dispersing the liquid crystal microcapsules 13 thus manufactured at a concentration of 10% in a 5% dispersion of fine vinyl acetate grains having an average grain size of 0.5 μm. The print pattern 52 can be formed by using the ink obtained as above.

Figure 17A:
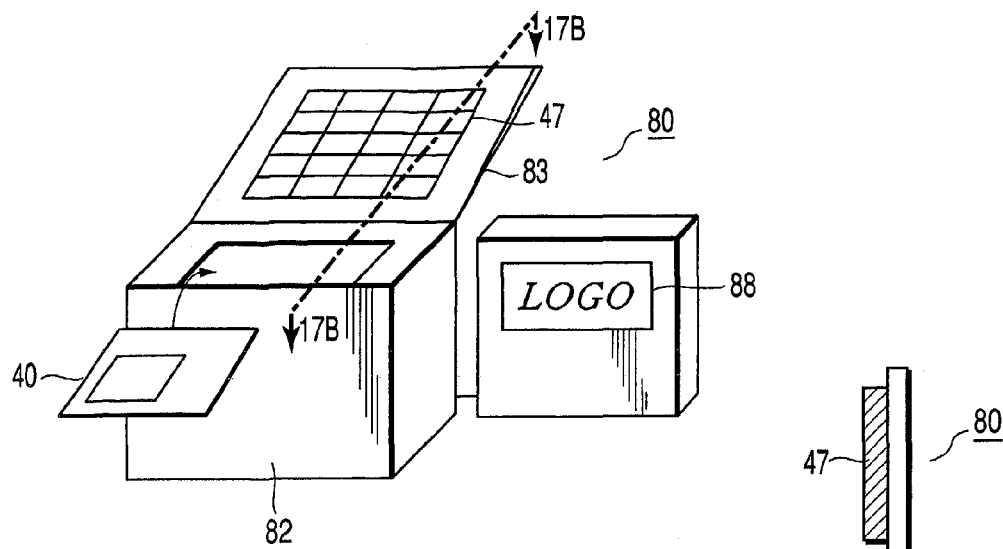
FIG. 17A is a perspective view schematically showing an example of a reproducing apparatus for the medium shown in FIGS. 16A and 16B.
Figure 17B:
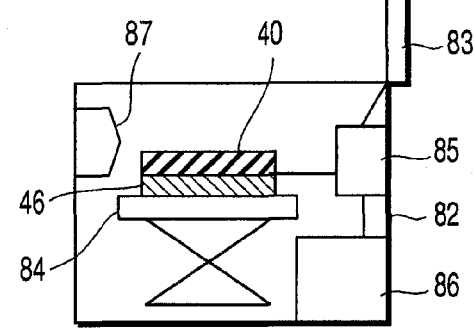
FIG. 17B is a sectional view taken along a plane 17B—17B of the apparatus shown in FIG. 17A.

The genuineness of the card 40 shown in FIGS. 16A and 16B can be checked by using, e.g., an apparatus shown in FIGS. 17A and 17B.

FIG. 17A is a perspective view schematically showing an example of a reproducing apparatus used to check the genuineness of the card 40 shown in FIGS. 16A and 16B. FIG. 17B is a sectional view taken along a plane 17B—17B of the apparatus shown in FIG. 17A. This reproducing apparatus 80 shown in FIGS. 17A and 17B has a housing 82 having an opening/closing portion 83 attached. A matrix array electrode 47 is formed on this opening/closing portion 83. A display unit 88 for displaying information recorded as the print pattern 52 on the card 40 is externally attached to the housing 82. This housing 82 contains an inspection table 84 on which an electrode 46 is formed and which has an elevating function, a detector 85 connected to the electrodes 46 and 47, a data processor 86 connected to the detector 85, and an electrostatic gun 87. A plurality of discrete electrodes constructing the array electrode 47 are individually connected to the detector 85 via lines (not shown).

The genuineness of the card 40 can be checked by using this reproducing apparatus 80 by, e.g., the following method. First, the card 40 is placed on the inspection table 84. The opening/closing portion 83 is then closed, and the inspection table 84 is moved down. After that, electrostatic charge is applied to the surface of the card 40 by the electrostatic gun 87, with the array electrode 47 grounded.

Subsequently, the array electrode 47 is opened, and the inspection table 84 is moved up to bring the card 40 into contact with the array electrode 47. After that, the values of currents flowing through the discrete electrodes of the array electrode 47 when these electrodes are connected to the counter electrode are integrated. In this manner, a charge amount distribution corresponding to the positions of the discrete electrodes is obtained.

For example, by blackening a position where the charge amount is equal to or larger than a predetermined threshold value and whitening a position where the charge amount is smaller than this threshold value, a charge amount distribution obtained by the above method is displayed on the display unit 88. The genuineness of the card 40 can be checked by examining whether the image displayed on the display unit 88 matches the logo mark 71 printed by regular black ink.

The fifth embodiment will be described below. In this fifth embodiment, similar to the above fourth embodiment, a print pattern containing liquid crystal microcapsules as a colorant which changes its dielectric constant upon application of an electromagnetic field is formed on an information recording substrate. In addition, an electrode pattern is formed on the information recording substrate such that at least a portion of the electrode is interposed between a portion of the print pattern and the information recording substrate. That is, in this embodiment the print pattern containing liquid crystal microcapsules is formed across a region where the electrode pattern is formed and a region where the electrode pattern is not formed on the information recording substrate.

When this structure is used, the dielectric constant can be changed only in a portion of the print pattern which is positioned on the electrode pattern. Therefore, it is possible to form a dielectric constant distribution across a portion of the print pattern positioned on the electrode pattern and the other portion, and thereby read information recorded as the print pattern.

In this fifth embodiment, the electrode pattern formed on the information recording substrate preferably has a continuous shape. When this is the case, voltage application can be performed in one portion. Also, in the fifth embodiment, the liquid crystal microcapsules may or may not be colored by a dichroic dye or the like. In the former case, a visible image can be formed using the liquid crystal microcapsules.

In the fourth and fifth embodiments described above, the liquid crystal microcapsules are favorably transparent in the normal state. In the fourth embodiment, the liquid crystal capsules 13 and the colorant 43 having no dielectric anisotropy can assume the same color in the normal state. In this case, it is possible to prevent visual identification of the pattern formed by the liquid crystal microcapsules 13 in the normal state.

In the fourth and fifth embodiments, the liquid crystal microcapsules 13 used in the first to third embodiments can be used as the colorant which changes its dielectric constant upon application of an electromagnetic field. In the fourth and fifth embodiments, however, no dichroic dye need be used because not a color change but a dielectric constant change is used.

In the fourth and fifth embodiments, the larger the dielectric anisotropy value ($\Delta\epsilon$) as a difference between the dielectric constant in the major axis direction and that in the minor axis direction of a molecule, the stronger the recording/reproduction signal. $\Delta\epsilon$ is desirably 10 or more.

In the fourth and fifth embodiments, the alignment state of the liquid crystal molecules 41 preferably remains unchanged by the potential level of, e.g., triboelectrification which occurs in common use or when a commercially available magnet is approached. That is, the energy required to change the alignment state of the liquid crystal molecules 41 is favorably sufficiently high.

This energy required to change the alignment state of the liquid crystal molecules 41 can be controlled by appropriately selecting the material. It is also possible to change both the alignment state and operation level of the liquid crystal molecules in the normal state by using an aspherical liquid crystal microcapsule 13. For example, when the liquid crystal microcapsule 13 is made long and thin, the alignment state of the liquid crystal molecules 41 is stable in the normal state if the major axis of each liquid crystal molecule is parallel to the longitudinal direction of the liquid crystal microcapsule 13, and the operation level concerning the direction perpendicular to this direction improves. When the liquid crystal microcapsule 13 is formed into a disk-like shape, alignment regulation acts strongly on the upper and lower surfaces, and the operation level concerning the direction perpendicular to this direction often lowers.

To control the operation level of the liquid crystal molecules 41 without exerting any influence upon other characteristics, it is most effective to change the grain size of the liquid crystal microcapsule 13. Generally, the grain size of the liquid crystal microcapsule 13 can be changed from a value less than 1 µm a valve more than 10 µm. An operating voltage of a few volts to a few hundred volts can be realized by changing the grain size in this range.

In the fourth and fifth embodiments, a method of generating and reading a dielectric constant distribution can be a method of applying an electromagnetic field to an entire print pattern containing the liquid crystal microcapsules 13 and reading out all information, or a method of partially applying an electromagnetic field and reading out only information of that portion. The advantage of the former method is that the method is simpler than the latter method. On the other hand, the latter method lowers the possibility of information being read out by somebody with knowledge of capacitance measurement, compared to the former method. To achieve a higher security level, it is also possible to use a method by which a print pattern containing the liquid crystal microcapsules 13 is a regular pattern such as a dot pattern, an electromagnetic field is partially applied to read information only in that portion, and the read information is collated with previously stored information.

In the fourth and fifth embodiments, if a dielectric constant distribution is repetitively generated, the alignment state of the liquid crystal molecules 41 does not always completely return to the normal state. When this is the case, the alignment state of the liquid crystal molecules 41 can be almost completely returned to the normal state by applying a strong electromagnetic field parallel or perpendicular to the principal surface of the substrate 11.

The first to fifth embodiments described above use the combination of a colorant which changes its color or dielectric constant upon application of an electromagnetic field, and a colorant which does not cause any such change even with application of an electromagnetic field. The sixth to tenth embodiments to be explained below use the combination of a plurality of types of colorants each of which changes its color or dielectric constant upon application of an electromagnetic field, and which are different in threshold voltage or response time (or response speed).

First, the sixth embodiment of the present invention will be described below.

Figure 18:
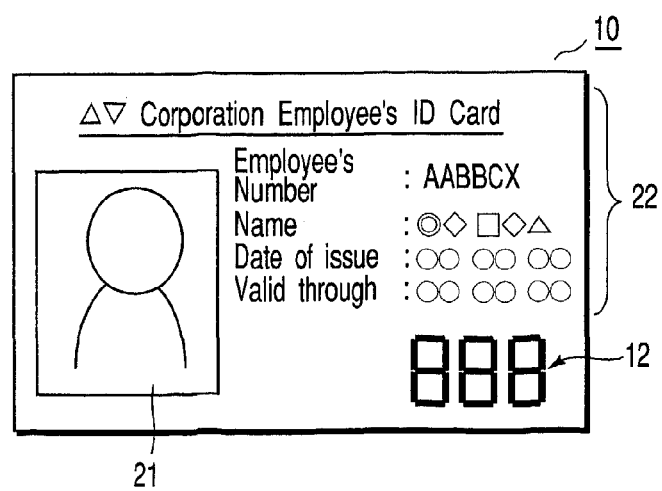
FIG. 18 is a plan view schematic ally showing the state of an information recording medium according to the sixth embodiment of the present invention when no voltage is applied.

FIG. 18 is a plan view schematically showing the state of an information recording medium according to the sixth embodiment of the present invention when no voltage is applied. This information recording medium 10 shown in FIG. 18 is a personal identification card such as an employee's ID card. The card 10 has an information recording substrate 11 such as plastic. On one principal surface of this substrate 11, an image 21 such as a photograph of the owner's face and characters 22 such as the employee number, name, date of issue, and term of validity are printed. A print pattern constructing the image 21 and the characters 22 is formed using ink containing colorants which do not change their colors even with application of an electric field, i.e., using conventionally used regular ink.

On the surface of the substrate 11 on which the image 21 and the characters 22 are printed, a print pattern 12 constructing a security image is formed. On the surface of the substrate 11 on which the image 21, the characters 22, and the print pattern 12 are formed, a transparent resin film or the like is adhered as a protective film 23 for protecting these pieces of information.

In this embodiment, the print pattern 12 is formed by a printing method by using a plurality of types of inks containing colorants which change their colors upon application of an electric field. This print pattern 12 displays the number "888" when no voltage is applied. Each of these inks contains, as at least one type of colorants, liquid crystal microcapsules 13 formed by encapsulating a mixture of a field-sensitive liquid crystal material and a dichroic dye with a thin transparent film. The threshold voltage of the colorant which changes its color upon application of an electric field differs from one ink to another.

The print pattern 12 can be formed using inks which contain liquid crystal microcapsules 13 manufactured by the following method.

First, about 80 parts by weight of the ZLI-1840 nematic liquid crystal with positive dielectric anisotropy manufactured by Merck, about 1 part by weight of the G-176 magenta dichroic dye manufactured by Nippon Kanko Shikiso Kenkyujo, about 7 parts by weight of a hydrophilic methylmethacrylate monomer, about 7 parts by weight of hydrophobic isobutylmethacrylate, about 1 part by weight of ethylene glycol dimethacrylate as a crosslinking agent, and about 0.2 parts by weight of benzoyl peroxide are mixed and dissolved. The solution mixture thus prepared is dispersed in a solution mixture of about 3 parts by weight of polyvinyl alcohol and about 300 parts by weight of pure water by using a homogenizer, thereby obtaining an emulsion.

This emulsion is stirred for one hour at a temperature of 85° C. to polymerize the monomer components. When one hour has elapsed, the emulsion is passed through a filter having a pore size of 1 µm and washed with pure water three times to obtain liquid crystal microcapsules 13 having average grain sizes of about 1 µm, about 6 µm, and about 10 µm. Note that the average grain size of the liquid crystal molecules can be controlled by adjusting the stirring rate during the polymerization.

Three types of inks are prepared by dispersing the liquid crystal microcapsules 13 thus manufactured and having average grain sizes of about 1 µm, about 6 µm, and about 10 µm, at a concentration of about 10% in an approximately 5% dispersion of fine vinyl acetate grains having an average grain size of about 0.5 µm. The print pattern 12 can be formed by using these three types of inks obtained as above.

Each of FIGS. 19A to 19D is a plan view showing a portion of the print pattern 12 of the card 10 shown in FIG. 18. FIG. 19A shows a portion of the print pattern 12 when no voltage is applied or when a voltage of less than 1 V is applied. FIGS. 19B, 19C, and 19D illustrate a portion of the print pattern 12 when voltages of 1 to less than 2 V, 2 V to less than 3 V, and 3 V or more, respectively, are applied.

As shown in FIG. 19A, the figure "8" formed by the print pattern 12 is composed of three types of print patterns 12*a* to 12c. The pattern 12a is formed using ink containing liquid crystal microcapsules 13 having an average grain size of about 1 μm, and has a threshold voltage of 1 V. The pattern 12b is formed using ink containing liquid crystal microcapsules 13 having an average grain size of about 6 μm, and has a threshold voltage of 2 V. The pattern 12c is formed using ink containing liquid crystal microcapsules 13 having an average grain size of about 10 μm, and has a threshold voltage of 3 V.

As shown in FIG. 19A, these patterns 12a to 12c are colored to display the figure "8", when no voltage is applied.

When a voltage of 1 to less than 2 V is applied to the patterns 12a to 12c, the pattern 12a becomes transparent because the alignment direction of liquid crystal molecules changes in the liquid crystal microcapsules 13 forming the pattern 12a. Since, however, the alignment directions of liquid crystal molecules do not change in the liquid crystal microcapsules 13 forming the patterns 12b and 12c, these patterns 12b and 12c maintain their colored states. As a consequence, the figure "6" is displayed as shown in FIG. 19B.

When a voltage of 2 to less than 3 V is applied to the patterns 12a to 12c, the patterns 12a and 12b become transparent because the alignment directions of liquid crystal molecules change in the liquid crystal microcapsules 13 forming these patterns 12a and 12b. However, since the alignment direction of liquid crystal molecules does not change in the liquid crystal microcapsules 13 forming the pattern 12c, this pattern 12c maintains its colored state. As a consequence, the figure "5" is displayed as shown in FIG. 19C.

When a voltage of 3 V or more is applied to the patterns 12a to 12c, these patterns 12a to 12c become transparent because the alignment directions of liquid crystal molecules change in the liquid crystal microcapsules 13 forming the patterns 12a to 12c. Consequently, nothing is displayed as shown in FIG. 19D.

Accordingly, by appropriately constructing the print pattern 12 by the liquid crystal microcapsules 13 having different threshold voltages, it is possible to display the number "888" when no voltage is applied or when a voltage of less than 1 V is applied, the number "697" when a voltage of 1 to less than 2 V is applied, the number "531" when a voltage of 2 to less than 3 V is applied, and the number "1" when a voltage of 3 V or more is applied.

In this embodiment, only one of these numbers "697", "531", and "1" is used as significant information, and the rest is handled as insignificant information. For example, only the number displayed when a voltage of 1 to less than 2 V is applied can be used in discrimination of the genuineness of the card 10, without using the number displayed when a voltage of 2 V or more is applied in discrimination of the genuineness of the card 10. In this case, a person who does not know that the key voltage for reading out significant information is 1 to less than 2 V cannot know which of "697", "531", and "1" is the significant information. That is, since the numbers "531" and "1" are used as dummy images not used in genuineness discrimination, extremely high forgery and/or fraudulent use preventiveness can be realized.

In this embodiment, the print pattern 12 is constructed using the three types of liquid crystal microcapsules 13 having different threshold voltages. However, the above effect can also be obtained by using two or more types of liquid crystal microcapsules 13 differing in threshold voltage. Additionally, in the embodiment the threshold voltage is controlled by changing the average grain size of the liquid crystal microcapsules 13. However, the threshold voltage can also be controlled by properly selecting the type of liquid crystal material, dichroic dye, or film. For example, it is possible by the use of appropriate materials to realize threshold voltages of 1.5, 2.3, and 3.5 V for liquid crystal microcapsules 13 having average grain sizes of 1, 6, and 10 μm, respectively.

The genuineness of the card 10 shown in FIG. 18 explained above can be checked by using the reproducing apparatus shown in FIGS. 3A and 3B. Note that the power of the power supply 16 can be either fixed or variable. The genuineness of the card 10 shown in FIG. 18 can also be checked by the use of a reproducing apparatus shown in FIG. 20.

FIG. 20 is a view schematically showing an example of a reproducing apparatus used to check the genuineness of the card 10 shown in FIG. 18. This reproducing apparatus 30 shown in FIG. 20 has substantially the same structure as the reproducing apparatus 30 shown in FIGS. 3A and 3B except that the apparatus further comprises a reader 36, a synchronous circuit 37, and an information processor 38.

The reader 36 reads an image formed by the print pattern 12 of the card 10 and converts the image into electric signals. As this reader 36, a device having a structure substantially similar to that of a barcode reader can be used. The electric signals from the reader 36 are supplied as image information to the information processor 38. This information processor 38 stores the image information supplied from the reader 36, and compares this image information with previously stored information.

The synchronous circuit 37 senses the voltage applied between electrodes 14 and 15 by a power supply 16, and drives the reader 36 in accordance with the sensed voltage. For example, this synchronous circuit 37 can drive the reader 36 in synchronism with the timing at which the voltage between the electrodes 14 and 15 reaches a preset value. This set value can also be stored in the information processor 38. Also, the information processor 38 can control the output from the power supply 16.

The seventh embodiment of the present invention will be described below.

In the sixth embodiment described above, high forgery and/or fraudulent use preventiveness is realized by setting the key voltage. In the seventh embodiment to be explained below, higher forgery and/or fraudulent use preventiveness is accomplished by setting the key voltage order.

In this seventh embodiment, a card 10 having a structure similar to that explained in the sixth embodiment can be used. Therefore, the seventh embodiment will be described below with reference to FIGS. 18 and 19A to 19D.

As described previously, a print pattern 12 shown in FIG. 19A is composed of print patterns 12a, 12b, and 12c having threshold voltages of 1, 2, and 3 V, respectively. This print pattern 12 displays the figure "8" when a voltage $V_0$ of less than 1 V is applied, the figure "6" when a voltage $V_1$ of 1 to less than 2 V is applied, the figure "5" when a voltage $V_2$ of 2 to less than 3 V is applied, and nothing when a voltage $V_3$ of 3 V or more is applied. That is, when voltages are applied in the order of, e.g., "$V_0 \rightarrow V_1 \rightarrow V_2 \rightarrow V_3$", information "8→6→5→no display" is obtained. Hence, by presetting, e.g., the order "$V_0 \rightarrow V_3 \rightarrow V_1 \rightarrow V_2$" as the key voltage order, information "8→no display→6→5" can be obtained as significant information, and information "8→6→5→no display" can be used as dummy information. In other words, a person who does not know this key voltage order cannot know the significant information. In this embodiment, therefore, extremely high forgery and/or fraudulent use preventiveness can be achieved.

Also, when the print pattern 12 displays the numbers "888", "697", "531", and "1" when the voltages $V_0$, $V_1$, $V_2$, and $V_3$, respectively, are applied, information "888→697→531→1" is obtained. Hence, by presetting, e.g., the order "$V_0 \to V_3 \to V_1 \to V_2$" as the key voltage order, information "888→1→697→531" can be obtained as significant information, and information "888→697→531→1" can be used as dummy information. In this case, therefore, higher forgery and/or fraudulent use preventiveness can be realized. Furthermore, in this case the key voltage can also be previously related to the position of a figure to be read. For example, when the relation is such that the right-hand, left-hand, and middle figures are read when the key voltages $V_1$, $V_2$, and $V_3$, respectively, are applied and "$V_0 \to V_3 \to V_1 \to V_2$" is set as the key voltage order, information "1→7→6" can be obtained as significant information.

The eighth embodiment of the present invention will be described below.

In the sixth and seventh embodiments, the print pattern 12 is formed into the shape of the number "8" or "888". In contrast, in this embodiment a dot matrix pattern or a graphic pattern is formed by the print pattern 12. Note that this embodiment is the same as the sixth and seventh embodiments except the shape of the print pattern 12.

Each of FIGS. 21A to 21D is a plan view schematically showing an example of the print pattern 12 according to the eighth embodiment of the present invention. FIG. 21A shows the print pattern 12 when no voltage is applied or when a voltage of less than 1 V is applied. FIGS. 21B, 21C, and 21D illustrate the print pattern 12 when voltages of 1 to less than 2 V, 2 to less than 3 V, and 3 to less than 4 V, respectively, are applied.

The print pattern 12 depicted in FIG. 21A is composed of four types of dot patterns, and these dot patterns are formed using inks containing liquid crystal microcapsules 13. The threshold voltages of these four types of dot patterns are 1, 2, 3, and 4 V, respectively.

As shown in FIGS. 21A to 21D, this print pattern 12 displays different images in accordance with different applied voltages. Accordingly, as explained in the sixth embodiment, of a plurality of different images displayed by the print pattern 12 upon application of voltages, an image displayed when a preset key voltage is applied can be used in genuineness discrimination, and the other images can be used as dummy images. Also, a key voltage order can be preset as explained in the seventh embodiment.

Furthermore, when the print pattern 12 forms a dot matrix pattern, a more complicated image can also be easily displayed upon application of a voltage. In this embodiment, therefore, a simple motion image can be displayed by changing the applied voltage.

Figure 22:
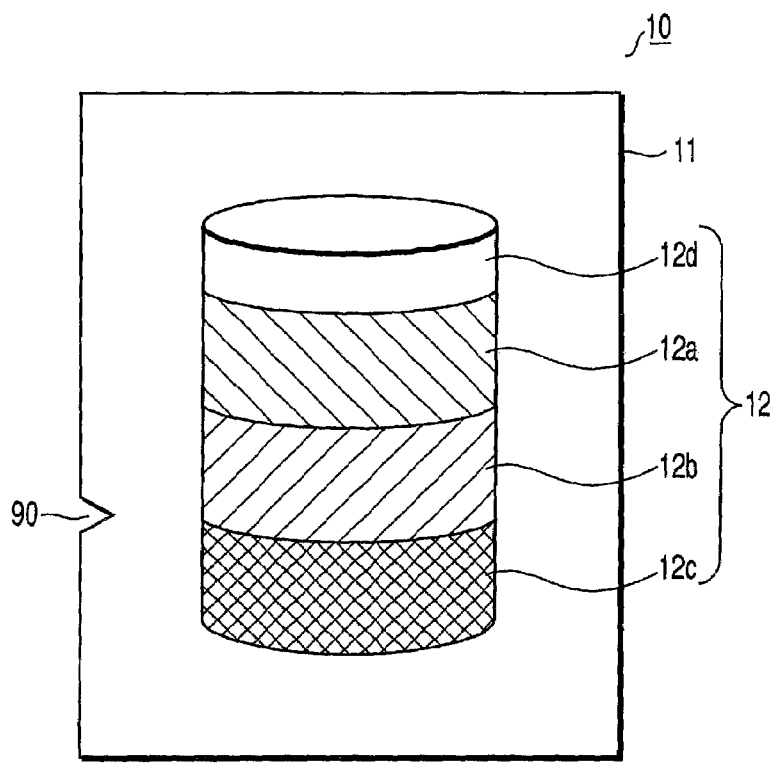
FIG. 22 is a plan view schematically showing another example of the print pattern according to the eighth embodiment of the present invention.

FIG. 22 is a plan view schematically showing another example of the print pattern 12 according to the eighth embodiment of the present invention. A card 10 shown in FIG. 22 is composed primarily of a substrate 11 and a print pattern 12 formed on one principal surface of the substrate 11. This print pattern 12 is composed of print patterns 12a to 12c and a pattern 12d indicating the contour of a can or the like. Each of the patterns 12a to 12c contains, as one type of a colorant, liquid crystal microcapsules 13 formed by encapsulating a mixture of a field-sensitive liquid crystal material and a dichroic dye with a thin transparent film. The threshold voltages of these patterns 12a to 12c are 1, 2, and 3 V, respectively. The pattern 12d contains a colorant which does not change its color even when impressed with an electric field.

The card 10 shown in FIG. 22 can also be used in inventory control. For example, a reproducing apparatus for the card 10 is installed at the entrance of a warehouse or the like. An inventory control apparatus is connected to this reproducing apparatus, and the remaining amount of goods, e.g., cans, stored in the warehouse is input to the inventory control apparatus. The inventory control apparatus so controls the reproducing apparatus as to apply a voltage corresponding to the remaining amount to the card 10. For example, the applied voltage is less than 1 V when the total stock is 100%; the applied voltage is 1 to less than 2 V when the total stock is 70% to less than 100%; the applied voltage is 2 to less than 3 V when the total stock is 30% to less than 70% of the initial stock; and the applied voltage is 3 V or more when the total stock is less than 30% of the initial stock. The card 10 can be made to correspond to the type of article by pasting a magnetic tape on the card 10 or forming a cut 90 in the card 10. By this method, the remaining amount of goods stored in the warehouse can be displayed on the card 10.

The ninth embodiment of the present invention will be described below.

In the eighth embodiment, a dot matrix pattern is formed by the print pattern 12. In this embodiment, a barcode pattern is formed by the print pattern 12. Note that this embodiment is the same as the eighth embodiment except for the shape of the print pattern 12.

Figure 23A:
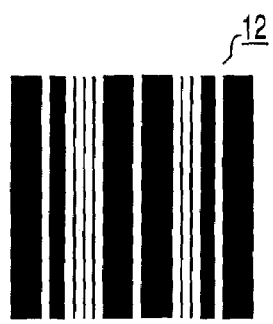
FIGS. 23A to 23C are plan views schematically showing examples of a print pattern according to the ninth embodiment of the present invention.
Figure 23B:
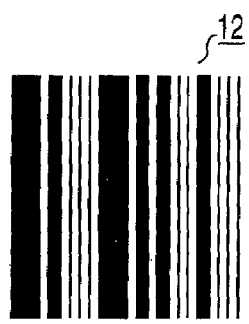
Figure 23C:
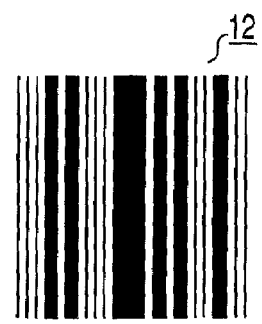

Each of FIGS. 23A to 23C is a plan view schematically showing an example of the print pattern 12 according to the ninth embodiment of the present invention. FIG. 23A shows the print pattern 12 when no voltage is applied or when a voltage of less than 1 V is applied. FIGS. 23B and 23C illustrate the print pattern 12 when voltages of 1 to less than 2 V and 2 V or more, respectively, are applied.

The print pattern 12 shown in FIG. 23A is composed of three types of band-like patterns. These band-like patterns are formed using inks containing liquid crystal microcapsules 13. The threshold voltages of these three types of dot patterns are 1, 2, and 3 V.

As shown in FIGS. 23A to 23C, the print pattern 12 displays different images in accordance with different applied voltages. Therefore, as explained in the sixth embodiment, of a plurality of different images displayed by the print pattern 12 upon application of voltages, an image displayed when a preset key voltage is applied can be used in genuineness discrimination, and the other images can be used as dummy images. Also, a key voltage order can be preset as explained in the seventh embodiment.

The tenth embodiment of the present invention will be described below.

In the sixth to ninth embodiments described above, a plurality of images are displayed by using differences between threshold voltages. By contrast, in this embodiment a plurality of images are displayed by using differences between response times or response speeds.

For example, a pattern 12a of a print pattern 12 shown in FIG. 19A is formed using ink containing liquid crystal microcapsules 13 having a response time of 1 ms. Likewise, a pattern 12b is formed using ink containing liquid crystal microcapsules 13 having a response time of 2 ms, and a pattern 12c is formed using ink containing liquid crystal microcapsules 13 having a response time of 3 ms. When the print pattern 12 shown in FIG. 19A is thus constructed, image changes with time as explained below can be observed upon application of voltages.

As shown in FIG. 19A, the patterns 12a to 12c are colored and display the figure "8" when no voltage is applied.

When 1 ms has elapsed after a predetermined voltage is applied to these patterns 12a to 12c, the pattern 12a becomes transparent because the alignment direction of liquid crystal molecules changes in the liquid crystal microcapsules 13 forming the pattern 12a. Since, however, the alignment directions of liquid crystal molecules do not change in the liquid crystal microcapsules 13 forming the patterns 12b and 12c, these patterns 12b and 12c maintain their colored states. As a consequence, the figure "6", is displayed as shown in FIG. 19B.

When 2 ms have elapsed after the voltage is applied to the patterns 12a to 12c, the patterns 12a and 12b become transparent because the alignment directions of liquid crystal molecules change in the liquid crystal microcapsules 13 forming these patterns 12a and 12b. However, since the alignment direction of liquid crystal molecules does not change in the liquid crystal microcapsules 13 forming the pattern 12c, this pattern 12c maintains its colored state. As a consequence, the figure "5" is displayed as shown in FIG. 19C.

When 3 ms have elapsed after the voltage is applied to the patterns 12a to 12c, these patterns 12a to 12c become transparent because the alignment directions of liquid crystal molecules change in the liquid crystal microcapsules 13 forming the patterns 12a to 12c. Consequently, nothing is displayed as shown in FIG. 19D.

In this embodiment, information "8→6→5→no display" obtained by the above method can be used as significant information. It is also possible to preset a key time to use only an image obtained when this key time has elapsed after voltage application as significant information, and use the other images as dummy images.

The response time can be controlled by appropriately selecting the type of liquid crystal material or the type of film encapsulating the material, and properly setting the grain size of the liquid crystal microcapsule 13. For example, the difference between the response time of a nematic liquid crystal material and that of a smectic liquid crystal material can be used.

In the first to tenth embodiments described above, a colorant which changes its color or dielectric constant upon application of a voltage is directly printed on an information recording substrate. However, this colorant can also be printed on a film or foil to form a printed product such as a self-adhesive seal, a self-adhesive sticker, or a sheet with an adhesive. This printed product can be manufactured by a method similar to those explained in the first to tenth embodiments.

In the present invention as has been described above, to impart forgery and/or fraudulent use preventiveness, a print pattern is formed which contains a first colorant which changes its color or dielectric constant upon application of an electromagnetic field having predetermined intensity, and a second colorant which behaves differently from the first colorant upon application of the same electromagnetic field. When this print pattern is used, it is possible, by an extremely simple method of applying an electromagnetic field, to perform genuineness discrimination, record different pieces of information on different media, and form complicated patterns, and the recorded information cannot be rewritten. Hence, the present invention can readily impart forgery and/or fraudulent use preventiveness and at the same time can make forgery and/or fraudulent use very difficult.

That is, the present invention provides an information recording medium superior in forgery and/or fraudulent use preventiveness, a reproduction method capable of reproducing information recorded on this medium, and a method of discriminating an information recording medium whose genuineness is unknown between a genuine article and a counterfeit, when the above medium is used as the genuine article.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium comprising:
   a substrate; and
   a print pattern formed on the substrate and containing
   a first colorant which changes at least one property selected from the group consisting of a color and a dielectric constant thereof upon application of an electromagnetic field having a first intensity, wherein the first colorant contains microcapsules each comprising a liquid crystal material and a film encapsulating the liquid crystal material or microcapsules each comprising a mixture of a liquid and a color substance which causes electrophoresis and a film encapsulating the mixture, and
   a second colorant which behaves differently from the first colorant upon application of the first electromagnetic field.

2. The medium according to claim 1, wherein the first colorant changes the color thereof upon application of the electromagnetic field, and the second colorant maintains the color thereof unchanged independently of the intensity of an electromagnetic field applied.

3. The medium according to claim 1, wherein the first colorant changes the color upon application of the electromagnetic field, and the second colorant maintains the color thereof unchanged upon application of the electromagnetic field and changes the color thereof upon application of an electromagnetic field having a second intensity higher than the first intensity.

4. The medium according to claim 1, wherein the first and second colorants change the colors thereof upon application of the electromagnetic field, and a time required for the first colorant to change the color thereof after application of the electromagnetic field differs from a time required for the second colorant to change the color thereof after application of the electromagnetic field.

5. The medium according to claim 1, wherein the first colorant changes the dielectric constant thereof upon application of the electromagnetic field, and the second colorant maintains the dielectric constant thereof unchanged upon application of the electromagnetic field.

6. The medium according to claim 1, wherein the first colorant containing liquid crystal microcapsules each comprising a liquid crystal material and a film encapsulating the liquid crystal material.

7. The medium according to claim 6, wherein the liquid crystal material contains a dichroic dye.

8. The medium according to claim 7, wherein the second colorant contains liquid crystal microcapsules each comprising a liquid crystal material containing a dichroic dye and a film encapsulating the liquid crystal material.

9. The medium according to claim 8, wherein an average grain size of the liquid crystal microcapsules in the first colorant differs from an average grain size of the liquid crystal microcapsules in the second colorant.

10. The medium according to claim 1, wherein a surface of the substrate to which the print pattern is provided is conductive, and the medium further comprises a transparent electrode which faces the conductive surface of the substrate with the print pattern sandwiched therebetween.

11. The medium according to claim 1, wherein the print pattern comprises a first pattern containing the first colorant and a second pattern containing the second colorant.

12. The medium according to claim 11, wherein the first and second patterns form at least one pattern selected from the group consisting of a bar code pattern and a dot matrix pattern.

13. A method of reproducing information recorded on an information recording medium, which comprises a substrate and a print pattern formed on the substrate and containing a first colorant which changes at least one property selected from the group consisting of a color and a dielectric constant thereof upon application of an electromagnetic field having a first intensity, wherein the first colorant contains microcapsules each comprising a liquid crystal material and a film encapsulating the liquid crystal material or microcapsules each comprising a mixture of a liquid and a color substance which causes electrophoresis and a film encapsulating the mixture, and a second colorant which behaves differently from the first colorant upon application of the first electromagnetic field, comprising:

reproducing the information by applying an electromagnetic field to the medium.

14. The method according to claim 13, wherein the first colorant changes the color thereof upon application of the electromagnetic field having the first intensity, and the second colorant maintains the color thereof unchanged upon application of the electromagnetic field having the first intensity, and the reproduction of the information comprises applying the electromagnetic field having the first intensity to the medium, thereby displaying an image $I_{g1}$ different from an image $I_{g0}$ displayed when no electromagnetic field is applied.

15. The method according to claim 14, wherein the second colorant changes the color thereof upon application of an electromagnetic field having second intensity higher than the first intensity, and the reproduction of the information comprises applying the electromagnetic field having the second intensity, thereby displaying an image $I_{g2}$ different from the image $I_{g0}$ and the image $I_{g1}$.

16. The method according to claim 13, wherein the first and second colorants change the color thereof upon application of the electromagnetic field having the first intensity, and a time required for the first colorant to change the color thereof after application of the electromagnetic filed having the first intensity differs from a time required for the second colorant to change the color thereof after application of the electromagnetic field having the first intensity, and the reproduction of the information comprises applying the electromagnetic field having the first intensity to the medium, thereby sequentially displaying an image $I_{gt1}$ different from an image $I_{g0}$ displayed when no electromagnetic field is applied and an image $I_{gt2}$ different from the image $I_{g0}$ and the image $I_{gt1}$.

17. A method of discriminating an information recording medium, which comprises a substrate and a print pattern formed on the substrate and whose genuineness is unknown, between a counterfeit information recording medium and a genuine information recording medium which comprises a substrate and a print pattern formed on the substrate and contains a first colorant which changes at least one property selected from the group consisting of a color and a dielectric constant thereof upon application of an electromagnetic field having a first intensity, wherein the first colorant contains microcapsules each comprising a liquid crystal material and a film encapsulating the liquid crystal material or microcapsules each comprising a mixture of a liquid and a color substance which causes electrophoresis and a film encapsulating the mixture, and a second colorant which behaves differently from the first colorant upon application of the electromagnetic field having the first intensity, comprising:

applying an electromagnetic field to the medium whose genuineness is unknown.

18. The method according to claim 17, wherein the first colorant changes the color thereof upon application of the electromagnetic field having the first intensity, and the second colorant maintains the color thereof unchanged upon application of the electromagnetic field having the first intensity, and the method further comprises comparing at least one of an image $I_{g1}$ displayed by the genuine medium when the electromagnetic field having the first intensity is applied and an image $I_{x0}$ displayed by the medium whose genuineness is unknown when no electromagnetic field is applied, with an image $I_{x1}$ displayed by the medium whose genuineness is unknown when the electromagnetic field having the first intensity is applied.

19. The method according to claim 17, wherein the first colorant changes the color thereof upon application of the electromagnetic field having the first intensity, and the second colorant maintains the color thereof unchanged upon application of the electromagnetic field having the first intensity and changes the color thereof upon application of an electromagnetic field having a second intensity higher than the first intensity, and the method further comprises at least one of comparing an image $I_{x1}$ displayed by the medium whose genuineness is unknown upon application of the electromagnetic field having the first intensity with an image $I_{g1}$ displayed by the genuine medium upon application of the electromagnetic field having the first intensity, and comparing an image $I_{x2}$ displayed by the medium whose genuineness is unknown upon application of the electromagnetic field having the second intensity with an image $I_{g2}$ displayed by the genuine medium upon application of the electromagnetic field having the second intensity.

20. The method according to claim 17, wherein the first and second colorants change the colors thereof upon application of the electromagnetic field having the first intensity, and a time $t_1$ required for the first colorant to change the color thereof after application of the electromagnetic field is shorter than a time $t_2$ required for the second colorant to change the color thereof after application of the electromagnetic field, and the method further comprises at least one selected from the group consisting of:

comparing an image $I_{xt1}$ displayed by the medium whose genuineness is unknown after a time $t_3$ has elapsed from application of the electromagnetic field having the first intensity, the time $t_3$ being not less than the time $t_1$ and less than the time $t_2$, with an image $I_{gt1}$ displayed by the genuine medium after the time $t_3$ has elapsed from application of the electromagnetic field having the first intensity;

comparing an image $I_{xt2}$ displayed by the medium whose genuineness is unknown after a time $t_4$ has elapsed from application of the electromagnetic field having the first intensity, the time $t_4$ being not less than the time $t_2$, with an image $I_{gt2}$ displayed by the genuine medium after the time $t_4$ has elapsed from application of the electromagnetic field having the first intensity; and comparing the image $I_{gt1}$, the image $I_{gt2}$ and an image $I_{g0}$ displayed by the medium whose genuineness is unknown when no electromagnetic field is applied.

21. The method according to claim 17, wherein the first colorant changes the color of the first colorant upon application of the first electromagnetic field, and the second colorant maintains a color of the second colorant unchanged upon application of the first electromagnetic field and changes the color of the second colorant upon application of a second electromagnetic field having a second intensity higher than the first intensity, and the method further comprises:

comparing an image $I_{x2}$ on the medium whose genuineness is unknown upon application of the second electromagnetic field with an image $I_{g2}$ on the genuine medium upon application of the second electromagnetic field.

22. The method according to claim 17, wherein the first colorant changes the color of the first colorant upon application of the first electromagnetic field, the second colorant changes a color of the second colorant upon application of the first electromagnetic field, and a time $t_1$ required for the first colorant to change the color of the first colorant after application of the first electromagnetic field is shorter than a time $t_2$ required for the second colorant to change the color of the second colorant after application of the first electromagnetic field, and the method further comprises:

comparing an image $I_{xt1}$ on the medium whose genuineness is unknown after a time $t_3$ has elapsed from application of the first electromagnetic field, the time $t_3$ being not less than the time $t_1$ and less than the time $t_2$, with an image $I_{gt1}$ on the genuine medium after the time $t_3$ has elapsed from application of the first electromagnetic field.

23. The method according to claim 17, wherein the first colorant changes the color of the first colorant upon application of the first electromagnetic field, the second colorant changes a color of the second colorant upon application of the first electromagnetic field, and a time $t_1$ required for the first colorant to change the color of the first 5 colorant after application of the first electromagnetic field is shorter than a time $t_2$ required for the second colorant to change the color of the second colorant after application of the first electromagnetic field, and the method further comprises:

comparing an image $I_{xt2}$ on the medium whose genuineness is unknown after a time $t_4$ has elapsed from application of the first electromagnetic field, the time $t_4$ being not less than the time $t_2$, with an image $I_{gt2}$ on the genuine medium after the time $t_4$ has elapsed from application of the first electromagnetic field.

24. The method according to claim 17, wherein the first colorant changes the color of the first colorant upon application of the first electromagnetic field, the second colorant changes a color of the second colorant upon application of the first electromagnetic field, and a time $t_1$ required for the first colorant to change the color of the first colorant after application of the first electromagnetic field is shorter than a time $t_2$ required for the second colorant to change the color of the second colorant after application of the first electromagnetic field, and the method further comprises:

comparing an image $I_{gt1}$ on the genuine medium after a time $t_3$ has elapsed from application of the first electromagnetic field, the time $t_3$ being not less than the time $t_1$ and less than the time $t_2$, an image $I_{gt2}$ on the genuine medium after a time $t_4$ has elapsed from application of the first electromagnetic field, the time $t_4$ being not less than the time $t_2$, and an image $I_{g0}$ on the medium whose genuineness is unknown when no electromagnetic field is applied.

* * * * *